United States Patent [19]

Gabbe et al.

[11] 4,255,796
[45] Mar. 10, 1981

[54] ASSOCIATIVE INFORMATION RETRIEVAL CONTINUOUSLY GUIDED BY SEARCH STATUS FEEDBACK

[75] Inventors: John D. Gabbe, Little Silver; Charles N. Judice, Lincroft; Thomas B. London, Tinton Falls, all of N.J.

[73] Assignee: Bell Telephone Laboratories, Incorporated, Murray Hill, N.J.

[21] Appl. No.: 877,677

[22] Filed: Feb. 14, 1978

[51] Int. Cl.³ .................. G06F 15/40; G06F 7/28; G11C 15/00
[52] U.S. Cl. .................................................. 364/900
[58] Field of Search ... 364/900 MS File, 200 MS File

[56] References Cited

U.S. PATENT DOCUMENTS

| Re. 26,919 | 6/1970 | Hagelbarger et al. | 364/200 |
|---|---|---|---|
| 3,221,308 | 11/1965 | Petersen et al. | 364/900 |
| 3,302,186 | 1/1967 | Raser et al. | 364/900 |
| 3,448,436 | 6/1969 | Machol, Jr. | 364/900 |
| 3,644,898 | 2/1972 | Post | 364/900 |
| 3,729,712 | 4/1973 | Glassman | 364/900 |
| 3,947,825 | 3/1976 | Cassada | 364/900 |
| 3,964,029 | 6/1976 | Babb | 364/900 |
| 4,020,473 | 4/1977 | Fujimura | 364/200 |

OTHER PUBLICATIONS

P. M. McDonnell, "Computer-Controlled Microform Search System for Patent Searching", in Journal of the Patent Office Society, vol. 59, No. 3, 3/77, pp. 175-179.

*Primary Examiner*—Melvin B. Chapnick
*Attorney, Agent, or Firm*—John Francis Moran

[57] ABSTRACT

An associative information retrieval system accepts information from a user and generates a query mask utilizing nested superimposed code words to search through and to find partial matches with the content of an auxiliary store. The auxiliary store contains similarly generated code words each produced from attribute values of records on a central store. The user information is put through the system on a character-by-character basis and the user is fed back information on the number of possible matches. The feedback informs the user on the incremental progress of the search produced in response to each newly entered character and also as part of a sequence that it may form with previously entered characters. The feedback information helps the user direct the search which the person does by supplying additional characters. When the number of possible matches is reduced to a manageable list, the index codes associated with the partially matching stored code words in the auxiliary store are used to locate complete records from a central store for display to the user to complete the retrieval process. In this latter process, false drops are eliminated by matching characters used to form the query mask directly with those of the records which were located via the nested superimposed code words.

1 Claim, 21 Drawing Figures

| RECORD ID | NAME | |
|---|---|---|
| 0 | RALPH L CLAAR | 100 |
| 1 | R E SMITH | 101 |
| 2 | EAST END AUTO BODY SHOP | 102 |
| 3 | FREDS BOWLING ALLEY | 103 |
| 4 | J FRIEDMAN | 104 |
| 5 | GENES AUTO CLEANERS | 105 |
| 6 | GREAT EASTERN BOATS | 106 |
| 7 | SHROVETIDE AUDITORIUM | 107 |
| 8 | JEANS SANDBAR | 108 |
| 9 | SAMS GEMS AND JEWELRY | 109 |

|  | POSITION | | | | | | | | | |
|---|---|---|---|---|---|---|---|---|---|---|
|  | 00 | 01 | 02 | 03 | 04 | 05 | 06 | 07 | 08 | 09 |
| QUERY MASK | 0 | 1 | 0 | 1 | 0 | 0 | 1 | 1 | 0 | 0 |
| SCW ID#s 00 | 1 | 1 | 1 | 0 | 0 | 1 | 1 | 1 | 0 | 1 |
| 01 | 0 | 1 | 1 | 0 | 1 | 0 | 0 | 0 | 1 | 1 |
| 02 | 1 | 0 | 1 | 1 | 0 | 1 | 1 | 0 | 1 | 0 |
| 03 | 0 | 1 | 0 | 1 | 1 | 0 | 1 | 1 | 0 | 0 |
| 04 | 1 | 1 | 1 | 0 | 1 | 0 | 1 | 0 | 1 | 1 |
| 05 | 0 | 0 | 0 | 1 | 1 | 0 | 1 | 0 | 1 | 1 |
| 06 | 1 | 0 | 1 | 1 | 1 | 0 | 1 | 1 | 0 | 1 |
| 07 | 0 | 1 | 1 | 1 | 0 | 0 | 1 | 1 | 0 | 1 |
| 08 | 1 | 0 | 0 | 1 | 0 | 0 | 1 | 0 | 0 | 0 |
| 09 | 0 | 0 | 0 | 1 | 1 | 0 | 1 | 0 | 1 | 0 |

ASSOCIATIVE INFORMATION RETRIEVAL CONTINUOUSLY GUIDED BY SEARCH STATUS FEEDBACK

BACKGROUND OF THE INVENTION

This invention relates to arrangements for retrieving information via content addressable techniques and, more particularly, relates to a technique for increasing the speed and flow of information across the user-machine interface of such arrangements.

In a patent application of C. S. Roberts, Ser. No. 775,114, filed Mar. 7, 1977, now U.S. Pat. No. 4,118,788 issued on Oct. 3, 1978, and of common assignee, an associative information retrieval system is disclosed utilizing a superimposed code word technique. The superimposed code words are generated from key values contained in individual records collectively stored in an indexed mass memory. The superimposed code words are stored in an auxiliary file which is associatively searched using a query mask to identify matches. The query mask is formed from key values in information obtained from the user by the same superimposed code word technique. In the auxiliary file, an associated index code is provided for each superimposed code word. The associated index code for each matching superimposed code word serves to locate the correspondingly indexed record entry in the mass memory from which all the information is retrieved.

The foregoing system is advantageous to both the user and system designer. For the ease of the user, searching and retrieval functions in the system are independent of the order of key words received. Hardware implementation of the searching technique may utilize parallel processing design to achieve high speed operation. Furthermore, the system designer may utilize apparatus that may be expanded gracefully as the size of the data base grows. Although these advantages are important, further benefits will result if information were being processed as soon as it is received so that even the naive and occasional user may be guided while obtaining information with much simpler protocols than heretofore possible.

It is accordingly an object of this invention to provide an arrangement which operates using a minimal amount of information and speeds up the response time to the user.

A related object is to reduce errors by keeping the amount of information required to do a retrieval operation to a minimum.

Another object of the invention is to provide information to the user on the progress of the searching process and thereby educate the user as to the best query strategy.

SUMMARY OF THE INVENTION

The invention in its various aspects overcomes the limitations presented by the user-machine interface of conventional information retrieval arrangements. Broadly, the invention utilizes an improved technique of superimposed coding wherein each information character produces a response in the technique related to whether it occurs individually or in a sequence. In the improved technique as the user specifies each information character to form attribute values, the number of matches is fed back to the user to provide on-going information on the progress of the searching process.

In its broader aspects, the invention takes the form of a method and apparatus that generate nested superimposed code groups in response to each information unit and the way it occurs with respect to any other previously occurring information units. The information units usually occur in sequences to form complete attribute values while an individual code is produced related to its occurrence. The individual codes are superimposed or nested to form content related code groups which are stored in an auxiliary file for fast searches or used as the query mask for defining preselected portions of the code groups to be searched. The feedback arrangement indicates the effect each additional information character has in limiting the number of partially matching superimposed code groups.

In some of the further aspects of the invention, an arrangement stores the sequence produced by the occurrence of information units. The arrangement then splits up each sequence into successive outputs comprising the first information unit, the sequence of the first and second information units, the sequence of the first, second and third information units et cetera, until the final output including the total sequence all information units. An individual code is produced in response to each of these outputs using superimposed code generation.

In the systems aspect of the invention, the superimposed code technique is used to locate partially matching stored superimposed groups which each have an associated index code. The associated index codes are then used to locate corresponding records in a collection of records. These records are retrieved and compared directly with the alphanumeric information specified by the user to eliminate false drops.

BRIEF DESCRIPTION OF THE DRAWING

The foregoing and additional features and advantages of the present invention will be more fully appreciated from a consideration of the following detailed description, when read in light of the accompanying drawing.

DETAILED DESCRIPTION

1. Nomenclature

Figures 1, 2:
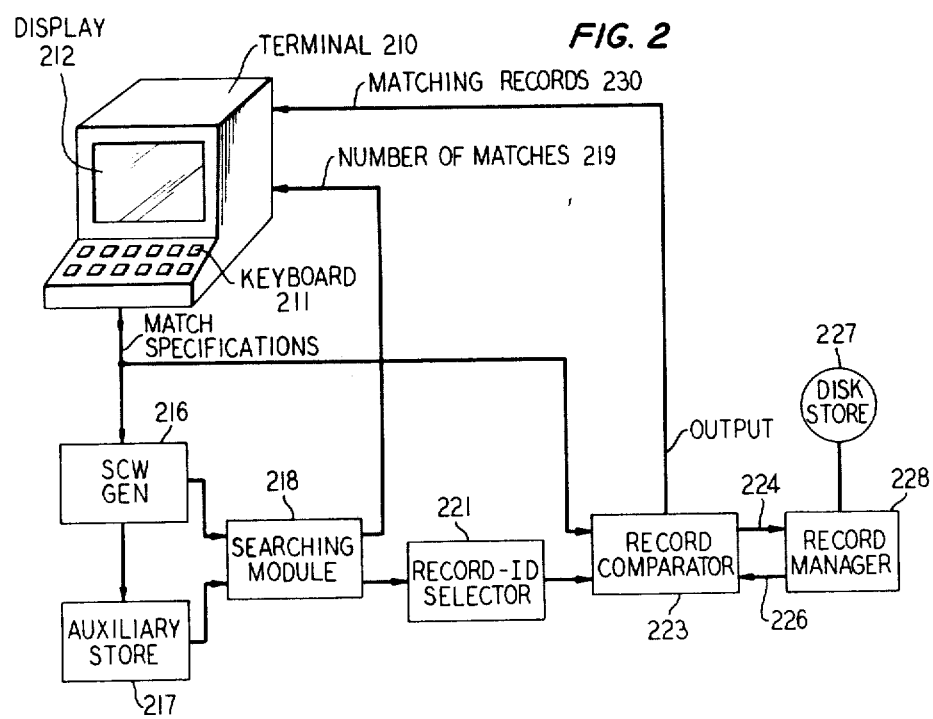
FIG. 1 is an illustration of ten records which might be included in a collection being searched.
FIG. 2 is a block diagram of a data retrieval system arranged in accordance with the invention.

The general purpose of the present invention is to provide the rapid identification, selection, or retrieval (all used synonymously) of particular records in a collection or file $E = \{R_1, R_2, R_3 \ldots R_N\}$ of records. Each record $R_i$ in the collection has its own unique subset of attribute values or key values $K_i = \{K_{i1}, K_{i2}, K_{i3} \ldots K_{ir_i}\}$, where the number $r_i$ of attribute values may vary from record to record. The overall set of attribute values is coextensive with all the subsets from the collection of individual records. Examples of collections which could be searched utilizing the present invention are the subscriber listings in a telephone directory, books in a library, inventory stocked in a warehouse, or photographs in an album. In the first and second examples, each individual subscriber listing and book in the library would constitute a record, as that term is used; in the case of an inventory of, say, fabrics, each style would be a record, even though no written indicia is involved. Similarly, a record might be a photograph, an oscillogram or a song.

In the photograph collection, the *attributes* of interest might be the subject matter of the photograph, the name of the photographer, the type of film used, exposure time and lens setting, the date taken, the date and place of publication, and so on. Attributes for inventory parts might be a part number and name, manufacturer, cost and sales price, reorder information, and so on. For the library collection, attributes would likely include standard card catalogue data, while the telephone book entries could, if desired, have attributes of class of service, type of equipment, and billing information in addition to the standard attributes of names, street number, street and phone number.

For a given record, the "value" of an attribute (attribute value), as that term is used herein, is generally given by an alphanumeric designation having one or more characters. Thus for a telephone listing: East End Auto Body Shop, 410 Sunrise Hwy, W. Islip the value of the complete name attribute is "East End Auto Body Shop", the value of the complete street number attribute is "410", the value of the complete street attribute is "Sunrise Hwy" and so on. For a particular photograph, the complete subject matter attribute may have a value "sunset", with the photographer, location, exposure and speed having complete attribute values "R. Jones", "Grand Canyon", "2.8" and "1/50", respectively.

Since the present invention is designed for associative retrieval wherein only part of the attribute values of a record are known, it is fundamental to the technique that attribute values be capable of modification, division or subclassification using any one of a number of possible schemes, which need not be mutually exclusive. For example, the complete attribute value "East End Auto Body Shop" may be supplemented by (or replaced by) attribute values of "East", "End" or "Body", or any combination thereof and in any order.

In this implementation of the invention, it is particularly advantageous to subdivide an attribute value in yet other ways; thus the characters in the words "East" may take the form of monograms, digraphs or bigrams, or n-grams to yield values "E", "EA", "EAS", and "EAST", which are referred to as nested attribute values. In short, the attribute values of a given record may include a plurality of alphanumeric characters or character groups, each of which represents or describes the record being encoded in some logical fashion.

In associative retrieval generally, desired records D are selected from the collection if they satisfy or possess one or more predetermined attribute values; an "inclusive query" or "query" set $Q = \{Q_1, Q_2, Q_3 \ldots Q_p\}$ includes $p$ predetermined attribute values, and the desired records are represented notationally $$D = \{R_i | R_i \leq E, Q \epsilon K_i\}, \qquad (1)$$

which reads: desired records are a set of records $R_i$ such that (1) $R_i$ is in the collection E and (2) the predetermined attribute values Q are among the attribute values $K_i$ of the record. However, since the present invention utilizes superimposed coding rather than simple linear searching, the selection or retrieval process may produce a spurious set of one or more "false drops" F in addition to the desired records D. Stated differently, superimposed coding will select or retrieve a set D' of records, where $D \leq D'$ and $D' = D \cup F$; by properly selecting the encoding parameters, the ratio of the set sizes, i.e., false drops divided by desired records, will desirably be maintained at a small value. An example further illustrating the meaning of a false drop will be given in the succeeding section.

In superimposed coding, "superimposed code words" (SCW's) for each record are formed by (1) encoding each subdivision of an attribute value of the record to form what will be referred to as an "individual code", and (2) combining the individual codes to form the SCW. Superimposed code words which are combinations of individual codes indicative of the attribute values that are the *object* of a search are formed, as will be illustrated hereinafter, using the same two-step technique. When these SCW's are used in this manner, they may be thought of as "query words" or "match specifications". While the novel nesting technique, taught by the present invention, of converting subdivisions of attribute values first to individual codes and then to SCW's or queries will be described more fully hereinafter, it may be stated here that the encoding process begins with a subdivision of a complete attribute value which is, in general terms, a single alphanumeric character which usually becomes part of a concatenation of alphanumeric characters (i.e., a number or numbers and/or a letter or letters in a sequence of occurrence) to form a complete attribute value and ends with a binary code representable as a string of ONES and ZEROES. It will be appreciated by those skilled in the art that alternate representations of a given binary code are possible, and are understood to be included in the principles set forth in the ensuing description. Furthermore, the binary codes may be based on phonemes or phonemic differences so that phonetic spelling errors do not create a false system response. Moreover, it will be understood that an alphanumeric character description of an attribute value can be converted, using many different code conversion techniques, to a different series of characters prior to encoding into individual codes in accordance with this invention. For example, the well-known ASCII code converts the characters on a teletypewriter keyboard to a 7-bit binary code; the EBCDIC code also converts alphanumerics to an 8-bit binary code. These latter codes may be linearly converted to still other codes without changing the information content thereof. Accordingly, in the following description, the attribute values including subdivisions thereof are encoded into individual codes and will be represented, in general, as streams of binary bits.

2. Illustration of Code Generation

In FIG. 1, a sample of a collection of ten typical names 100–109 consisting of listings that may be found in a typical telephone directory is shown. Each record has been assigned an integer in the range 0 to 9 as its record-ID; if the file was stored in a computer memory, the record-ID could be regarded as the record's storage address or index code, so that given the value of a record-ID, retrieval of the record's contents is easily done using well-known techniques.

An example of the assignment of individual codes to attribute values corresponding to alphanumeric characters and character sequences, and the combination of the individual codes to form SCW's will be instructive. In this example, it is assumed that the codes are 20 bits wide (b=20), and that the maximal code weight per complete attribute value is 3 (K=3). In the following Table, 50 n-grams are listed to generate SCW's for records of FIG. 1; next to each n-gram of an attribute value is one integer, which represent the locations of the ONES in individual codes which might have been formed for these values. Only the first three letters are used to designate words in excess of three letters. However, those skilled in the art may readily change the length of character sequences or strings in light of different file sizes and the nature of the attribute values included in such files. Of course, the integers listed are only exemplary, and other attribute values, for example, street address, town, or descriptive words such as "GAS", "CAR", et cetera could have been used as well.

TABLE 1

AV = (ATTRIBUTE VALUE SUBDIVISION)
ki = (Individual Code Location of ONES)

|  | AV | ki | AV | ki | AV | ki |
|---|---|---|---|---|---|---|
| 10 monograms | A | 18 | F | 15 | R | 7 |
|  | B | 12 | G | 8 | S | 11 |
|  | C | 19 | J | 4 |  |  |
|  | E | 3 | L | 4 |  |  |

|  | AV | ki | AV | ki | AV | ki |
|---|---|---|---|---|---|---|
| 15 digraphs or bigrams | AL | 6 | EA | 12 | JE | 0 |
|  | AN | 2 | EN | 14 | RA | 9 |
|  | AU | 19 | FR | 17 | SA | 14 |
|  | BO | 5 | GE | 3 | SH | 16 |
|  | CL | 10 | GR | 13 | SM | 1 |

TABLE 1-continued

|  | AV | ki | AV | ki | AV | ki |
|---|---|---|---|---|---|---|
| 25 trigrams | ALL | 18 | CLE | 2 | JEA | 7 |
|  | AND | 15 | EAS | 10 | JEW | 0 |
|  | AUD | 5 | END | 8 | RAL | 16 |
|  | AUT | 13 | FRE | 3 | SAM | 8 |
|  | BOA | 14 | FRI | 13 | SAN | 19 |
|  | BOD | 0 | GEM | 9 | SHO | 17 |
|  | BOW | 11 | GEN | 6 | SHR | 7 |
|  | CLA | 19 | GRE | 17 | SMI | 1 |

Table 1 demonstrates the different form of typical n-grams which may be utilized to generate all the SCW's for the name attributes listed in FIG. 1. Although the individual codes listed for each of the n-grams were arbitrarily selected by a human thought process to resemble a random process, they also serve to demonstrate the kind of operation utilized by the illustrative embodiment to be disclosd hereinafter in the generation of SCW's. Even though the process of generating an individual code in response to a particular n-gram is more or less a random process, the selection process *must* be reproducible so that the response to a given n-gram is the same. Table 1 also shows that the individual code response is different to the same alphanumeric character occurring second in a sequence because it follows a different first alphanumeric character. This characteristic is consistent for a given third character of a sequence producing a different individual code when either one or both of the first two characters are different.

When Table 1 is utilized, the SCW's are readily generated for each of the name attributes in FIG. 1. However, this process is cumulative and utilizes a nesting characteristic wherein the individual codes for subdivisions of a trigram being a monogram and a bigram are included in the cumulative code of that particular trigram. The following Table (Table 2) illustrates the cumulative nesting technique for generating the SCW for record ID 2. In this illustration of code generation, since only the first three letters are used to represent a character sequence of greater than three characters, those characters actually used to represent words exceeding three letters are underscored. The same code generation technique is used to provide a set of SCW's from attribute values in records and to produce a query mask from information supplied by user as the initial step for information retrieval.

TABLE 2

| ATTRIBUTE VALUE | WIDTH 20 CUMULATIVE CODES LOCATION OF ONES |
|---|---|
| E | 3 |
| E A | 3 12 |
| E A S T | 3 10 12 |
| E | 3 |
| E N | 3 14 |
| E N D | 3 8 14 |
| A | 18 |
| A U | 18 19 |
| A U T O | 13 18 19 |
| B | 12 |
| B O | 5 12 |
| B O D Y | 0 5 12 |
| S | 11 |
| S H | 11 16 |
| S H O P | 11 16 17 |

TABLE 2-continued

| COMPLETE ATTRIBUTE | COMPLETE SCW |
| --- | --- |
| East End Auto Body Shop | 0 3 5 |
| | 8 10 11 |
| | 12 13 14 |
| | 16 17 18 |

3. Record Retrieval Examples

An associative retrieval operation from the sample of records in FIG. 1 might be to identify all records in the collection which have a name attribute of "AUTO BODY REPAIR" which is user supplied information that forms the query mask or match specifications. From an examination of FIG. 1, the correct response to this query would appear to be the retrieval of the record with an ID of 2. However, since the complete name attribute of "AUTO" includes "A", "AU", and then "AUT", the retrieval operation utilizing the inventive principles will begin with the entry of the character "A". In this case, the feedback response will be the value of 5, which is the total of records with name attributes that start with "A" and/or include a SCW with bit 18 set to a "1" or records with ID's of 2, 3, 5, 7 and 9 in FIG. 1. When the character of "U" is entered after the "A", the query is now based upon "AU" which will provide a feedback value of 3. The entry of the character of "T" to perform a retrieval operation based upon the name attribute of "AUT" for "AUTO" as a sequence will yield a feedback value of 2 corresponding to records with ID's of 2 and 5. The entry of "B" for the start of "BODY" narrows the partially matching name attribute down to one with an ID of 2. From this example, it is evident that the searching operation or retrieval operation begins immediately and provides information back to the user indicative of the progress of the operation.

This example also illustrates that the searching process as indicated by the feedback value progressed sufficiently on the query mask generated from "AUTO BODY" (the underlinings indicate those characters actually entered) to identify one record uniquely before the entry of "REPAIR". This is signifcant since it demonstrates the value of the feedback in reducing errors by indicating to the user the progress of the search before the false or misleading entry of "REPAIR" as part of the name attribute.

The feedback therefore educates the user on the progress and relative quality of the search after each character entry. For example, if "REPAIR" were entered first, the feedback response would be 3 in response to the "R", 0 in response to the "RE" indicating that this query mask has no possible matches. An intelligent user would then know that other attribute values would have to be provided for the query mask, for example, such as "AUTO" and "BODY".

4. Basic System Architecture

In FIG. 2, terminal 210 provides the interaction interface between the user and the overall system which utilizes the inventive principles. At keyboard 211 of terminal 210, the user inputs to the system a sequence of alphanumeric characters also called match specifications. This input is applied to SCW generator 216 which forms a query mask. The query mask is then compared to the stored SCW list in auxiliary store 217 through searching module 218. In this arrangement, the SCW list has each word generated by the keys or attributes present in one of the records in central mass, or disk, store 227. Each of the SCW code words has bits set to a 1 in positions derived in a prescribed manner to be explained later. In this search, a partial match is utilized to find agreement between only the bits set to 1 in the query mask and the bits set to 1 in corresponding positions in the superimposed code words in store 217. Usually, the stored code words will have additional bits set to 1 since the user typically is able to generate only some of the keys or attribute values present in each record. In the typical system designs, store 217 will have a capacity of about 20-25 percent of disk store 227 which contains the complete collection. However, auxiliary store 217 may be linearly searched faster than store 227 which faciltates the partial-match used to find records retained in store 227.

When a partial match occurs, module 218 provides an output for record ID-selector 221 from which the record-ID number for record comparator 223 is derived. Record comparator 223 applies these ID numbers which are one form of an index code to record manager 228 via line 224. In response to each ID number, record manager 228 provides another address or index code to read the appropriate sectors of a mass storage such as disk store 227 and sends the content of the requested record back to comparator 223 on line 226. The remaining input to record comparator 223 also receives the coded alphanumeric output of keyboard 211. Record comparator 223 serves to eliminate false drops wherein the superimposed code words do correspond, but the actual information they are generated from do not correspond. The output records from comparator 223, which are devoid of false drops, are sent to display 212 via line 230.

An important feature of this arrangement is that the feedback indicative of the number of matches present on line 219, which appears on display 212 of terminal 210, educates the user on the progress of the search. It is understood that the feedback may be audible rather than visual. Suitable audio feedback may be in the form of tones, recorded messages, synthesized voice, or music. In any form, the feedback indicates the absolute selectivity of the query mask and also the incremental selectivity produced by each character addition to the query mask. When the number of matches is reduced to a low number, the records corresponding to these matches is produced by the output of record comparator 223 on line 230 which is applied to terminal 210 for display 212. This final step completes the retrieval process.

5. Sequence Storer

Figure 3:
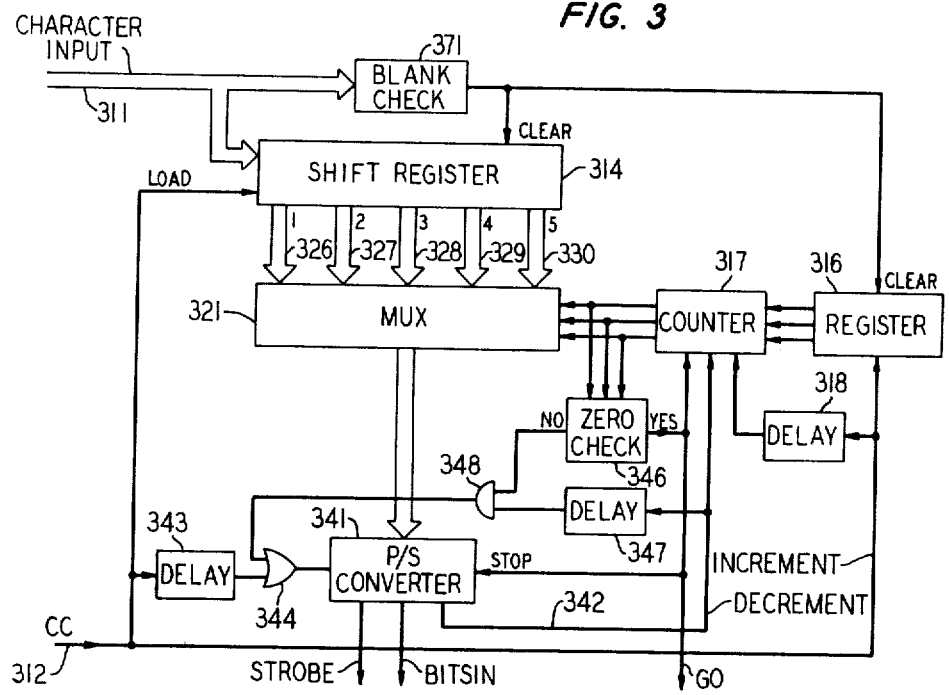
FIG. 3 is a diagram of a circuit which retains input signal sequences of query information characters.

The circuit of FIG. 3 accepts the output of a conventional keyboard which typically includes bit level signals accompanied by a character clock (CC) signal. Line 311 represents a parallel bus of conductors corresponding to the number of bits indicative of an alphanumeric character output from keyboard 211 of FIG. 2. When the signal levels of the conductors of bus 311 have stabilized, a CC pulse occurs on conductor 312 which signals shift register 314 to load. Each one of the signal levels is shifted into the first stage of a number of parallel units in register 314 to match the number of conductors in line or bus 311. The CC pulse is also applied to register 316 which transfers its stored value to counter 317 upon occurrence of a delayed CC pulse produced by the output of delay 318. Counter 317 produces an output, typically in binary form, for multiplexer 321 serving to enable gates within the multiplexer and complete signal transfer from bus 326, or the first of buses 326–330, of register 314 to parallel-to-serial converter 341. Converter 341 provides a binary pulse stream on line BITSIN indicative of the information present on bus 326. This output from converter 341 occurs in response to the belated CC pulse produced from the output of delay 343 via OR gate 344. The other output of converter 341 provides a narrow STROBE pulse to indicate when the character bit level signals are stable and should be read.

The operation of the circuit of FIG. 3 which provides a sequential character output becomes evident as the second character of a sequence is indicated at its input. In this case, register 316 contains an accumulation of the two CC pulses so that counter 317 is this time set to a value of 2. Counter 317 produces a binary 2 output which is applied to multiplexer 321 and enables the signal levels present on bus 327 to pass through the multiplexer to converter 341. After the last bit in the binary sequence occurs on the BITSIN line, counter 341 issues a pulse on conductor 342 for counter 317 to signal the end of the parallel-to-serial signal conversion. Counter 317 decreases its count by 1 and applies an output indicative of same to multiplexer 321. Also present in the circuit of FIG. 3 are zero check circuit 346, delay 347, AND gate 348 which provide the other input to OR gate 344. The function of these elements is to activate converter 341 for subsequent character outputs after the initial character output until all of the characters received in the input sequence in register 314 are produced at the output of converter 341.

After the last character of a sequence is obtained from register 314 on bus 326, counter 317 goes to 0 count which is detected by zero check circuit 346. Circuit 346 then issues a signal that resets counter 317 so that it will remain inactive until a CC pulse is produced at the output of delay 318. The same signal is also applied to converter 341 to make it inactive. At the end of each input character sequence, a special character (e.g., carriage return or blank signal) is produced to indicate this condition. This is detected by blank check circuit 371 which issues an output pulse to clear registers 314 and 316 so that they will be ready to receive the next sequence of alphanumeric character inputs.

6. Superimposed Code Word Generator

Figure 4:
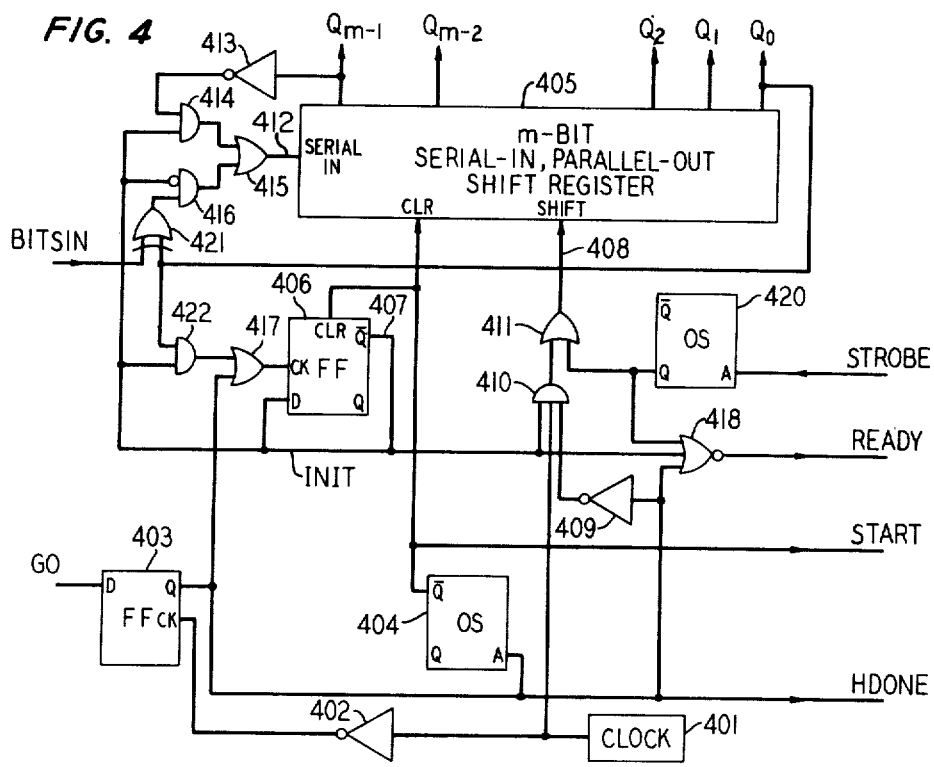
FIG. 4 is a block diagram of a hashing circuit constructed in accordance with the principles of the present invention.
Figure 5:
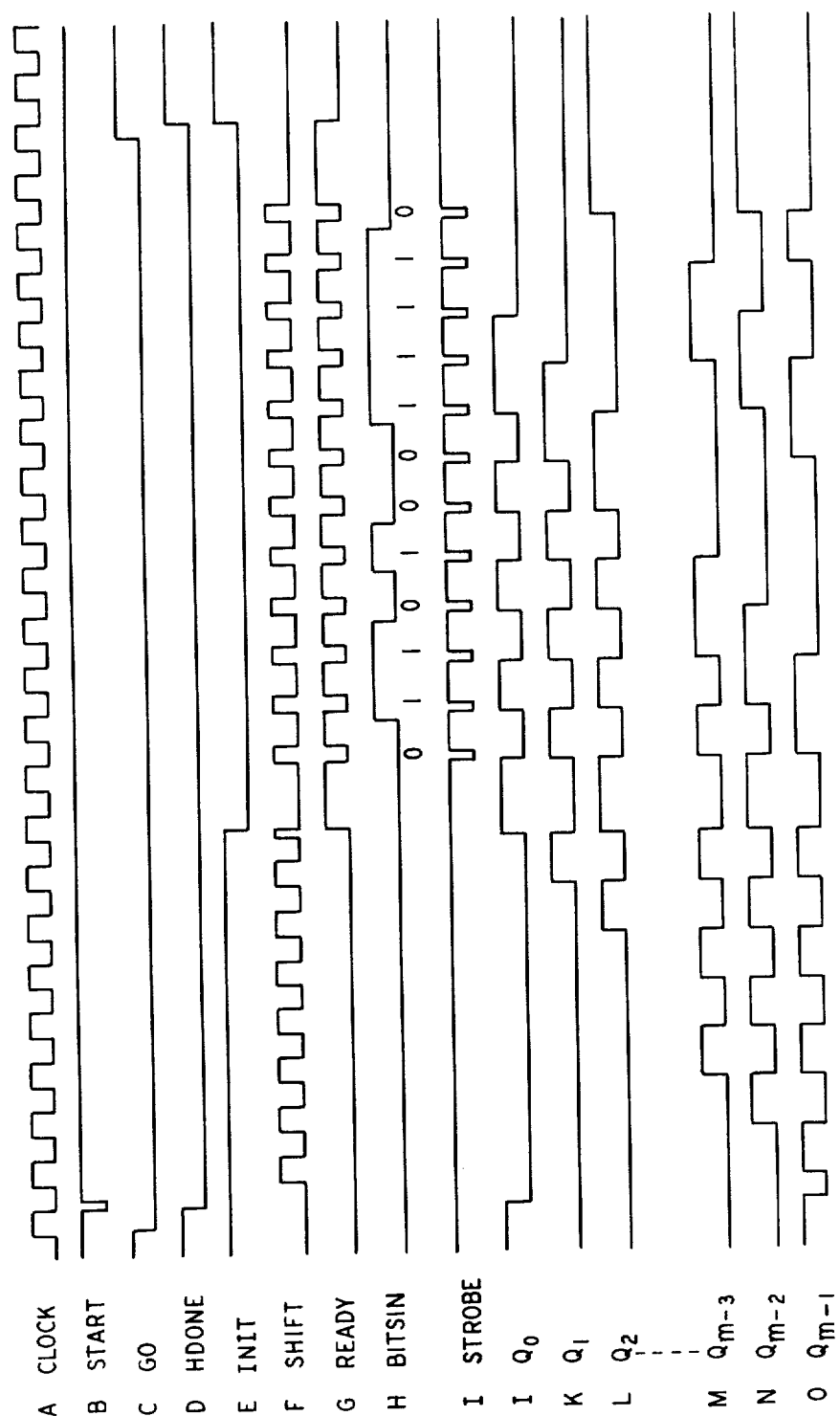
FIG. 5 is a timing diagram for the circuit of FIG. 4.

As the next step in the process of forming SCW codes, an arrangement for performing a mapping function using a process called "hashing" is shown in block diagram form in FIG. 4; a timing diagram indicating signal levels present at various circuit points within the arrangement is shown in FIG. 5. The mapping function may be thought of as accepting an input bit string of n arbitrary bits and converting it to a bit string of m bits indicative of an integer value lying within a predefined range. When the circuit of FIG. 4 is idle, the input lead labeled "GO" is held at a high logic level, and the previously computed m-bits of output are present on the m output leads designated $Q_0$ through $Q_{m-1}$. To initiate the generation of the next m-bits, the GO lead is brought to a low logic level (FIG. 5, waveform C). At the next high/low transition of clock 401 (waveform A), which transition is inverted in inverter 402, the Q output of flip-flop 403 goes low, as shown in FIG. 5, waveform D. This low on the lead labeled HDONE causes a one-shot circuit 404 to produce a short negative going pulse on the output line labeled "START" (waveform B), which pulse is useful for synchronizing the circuit of FIG. 4 with other related circuits. With the "GO" input remaining low, the n-bits input to the circuit are applied on the input lead labeled BITSIN, under the control of the leads labeled STROBE and READY, as will be described hereinafter. When the n-bits have been entered, the "GO" lead is brought to the high state, causing HDONE to go high to indicate completion. At this time, the desired m-bit output will be present on leads $Q_0$ through $Q_{m-1}$.

The internal operation of the circuit of FIG. 4 is centered around an "m-bit serial-in, parallel-out" shift register 405, which may include, for example, TTL integrated circuits SN74164 manufactured by Texas Instruments Corp. Register 405, as well as a flip-flop 406, is initially cleared by the start pulse output of one-shot 404. Thus, the m-bits stored in register 405 are all low, and the $\overline{Q}$ output of flip-flop 406 on lead 407 labeled INIT (see waveform E) is high.

Shift register 405 is arranged to shift from left to right on each low to high transition on its "SHIFT" input line 408 (see waveform F). With HDONE low, the output of inverter 409 is high, as is INIT lead 407, so that AND gate 410 is enabled to pass pulses generated by clock 401 through to the SHIFT input of register 405 via an OR gate 411. Inspection of the circuit feeding the serial-in terminal 412 of register 405 will reveal that alternate highs and lows are shifted into position $Q_{m-1}$: at the first SHIFT pulse, $Q_{m-1}$ is low, so that inverter 413 supplies a high to one input of AND gate 414. Since the other input to gate 414 is the high INIT signal, OR gate 415 will pass a high to register 405 on line 412. At the next SHIFT pulse, $Q_{m-1}$ is high, so that the outputs of inverter 413 and AND gate 414 are low. The output of AND gate 416 is also low, by virtue of the inverted INIT signal applied at one of its inputs. Thus, the output of OR gate 415 couples a low on line 412 to the register 405. The foregoing procedure then repeats, so that after m shifts, register 405 contains alternate highs and lows in its m stored positions, with the rightmost position $Q_0$ being high. This high, together with the high on the INIT lead, are coupled through AND gate 422 and OR gate 417 to the clock input of flip-flop 406, toggling that flip-flop and causing INIT to go low. Now, AND gate 410 is disabled from passing further SHIFT pulses to register 405.

When INIT goes low, the output of NOR gate 418 goes high. This output, labeled READY (shown in waveform G) indicates to the external equipment (not shown) that the circuit is ready to accept, one bit at a time, the n-bit input that is to be processed. When the first input bit is presented on the BITSIN line, the external circuitry must concurrently send a short negative going pulse on the STROBE line to indicate to the circuit of FIG. 4 that it should process this bit. This pulse triggers one-shot 420 to produce a short positive going pulse which is passed through OR gate 411 to the SHIFT input of register 405. Concurrently, the high output of one-shot 420 is applied to NOR gate 418, causing the READY lead to become low for a short time; in this interval, the circuit "processes" the bit presented on the BITSIN line. When the output of one-shot 420 again goes low, the READY lead goes high again, and the circuit is then able to accept another input bit.

Each bit presented on the BITSIN lines is combined in exclusive OR gate 421 with the current contents of register 405 bit position $Q_0$; the result is then presented at the serial-in input 412 to register 405 via AND gate 416 and OR gate 415. The aforementioned SHIFT pulses on line 408 causes a right shift by one position and the process is then repeated for the next value presented on the BITSIN line. After the last bit of information is presented on the BITSIN lead, the GO lead is raised to a high level, HDONE then becomes high, and the process is complete. An example of the operation of the FIG. 4 circuit for the case where m=8 is presented in the following table for a twelve bit sequence (n=12) having the bit values of 011010011110 and depicted as waveform H: (BITSIN input); the signals present at output terminals $Q_0$, $Q_1$, $Q_2$, $Q_5$, $Q_6$ and $Q_7$ are represented by waveforms J through O of FIG. 5.

TABLE 3

| AFTER STROBE PULSE | BITS IN | $Q_7$ | $Q_6$ | $Q_5$ | $Q_4$ | $Q_3$ | $Q_2$ | $Q_1$ | $Q_0$ |
|---|---|---|---|---|---|---|---|---|---|
| 0  | 0 | 0 | 1 | 0 | 1 | 0 | 1 | 0 | 1 |
| 1  | 1 | 1 | 0 | 1 | 0 | 1 | 0 | 1 | 0 |
| 2  | 1 | 1 | 1 | 0 | 1 | 0 | 1 | 0 | 1 |
| 3  | 0 | 0 | 1 | 1 | 0 | 1 | 0 | 1 | 0 |
| 4  | 1 | 0 | 0 | 1 | 1 | 0 | 1 | 0 | 1 |
| 5  | 0 | 0 | 0 | 0 | 1 | 1 | 0 | 1 | 0 |
| 6  | 0 | 0 | 0 | 0 | 0 | 1 | 1 | 0 | 1 |
| 7  | 1 | 1 | 0 | 0 | 0 | 0 | 1 | 1 | 0 |
| 8  | 1 | 1 | 1 | 0 | 0 | 0 | 0 | 1 | 1 |
| 9  | 1 | 0 | 1 | 1 | 0 | 0 | 0 | 0 | 1 |
| 10 | 1 | 0 | 0 | 1 | 1 | 0 | 0 | 0 | 0 |
| 11 | 0 | 1 | 0 | 0 | 1 | 1 | 0 | 0 | 0 |
| 12 |   | 0 | 1 | 0 | 0 | 1 | 1 | 0 | 0 |

The small arrows in the Table indicate that the value of $Q_6$ is derived from the previous value of $Q_7$, that $Q_5$ is derived from the previous value of $Q_6$, and so on. The value of $Q_7$ is, of course, determined by the exclusive OR function of $Q_0$ and bits-in from the previous line; this function is shown in Table 4.

TABLE 4

| $Q_0$ | BITS IN | → | $Q_7$ |
|---|---|---|---|
| 1 | 1 | → | 0 |
| 1 | 0 | → | 1 |
| 0 | 1 | → | 1 |
| 0 | 0 | → | 0 |

From Table 3, it will be seen that the input n-bit value 011010011110 has been mapped into the m-bit output value 01001100. A table showing this and other examples of the conversion process achieved in the circuit of FIG. 4 is as follows:

TABLE 5

| Example No. | INPUT | OUTPUT |
|---|---|---|
| 1 | 0110 1001 1110 | 0100 1100 |
| 2 | 0100 1001 1110 | 0000 1100 |
| 3 | 0010 1001 1110 | 0110 1100 |
| 4 | 0010 1011 0110 | 0111 1000 |
| 5 | 0010 1011 0111 | 1111 1000 |
| 6 | 1010 1011 0111 | 1110 1000 |
| 7 | 0110 1001      | 1100 0011 |

Comparisons between examples 1 and 2 and examples 2 and 3 in Table 5 show that one bit changes in the input data do produce changes in the output data, as was desired in the restraints set forth above. Also, comparison between examples 1 and 7 shows that a change in the number n of input bits also desirably changes the output mapped value. The outputs shown in Table 5 are easily converted from binary to decimal form; for n=8, the output is mapped into the range of integers between 0 and $2^8 - 1 = 255$.

Figure 6:
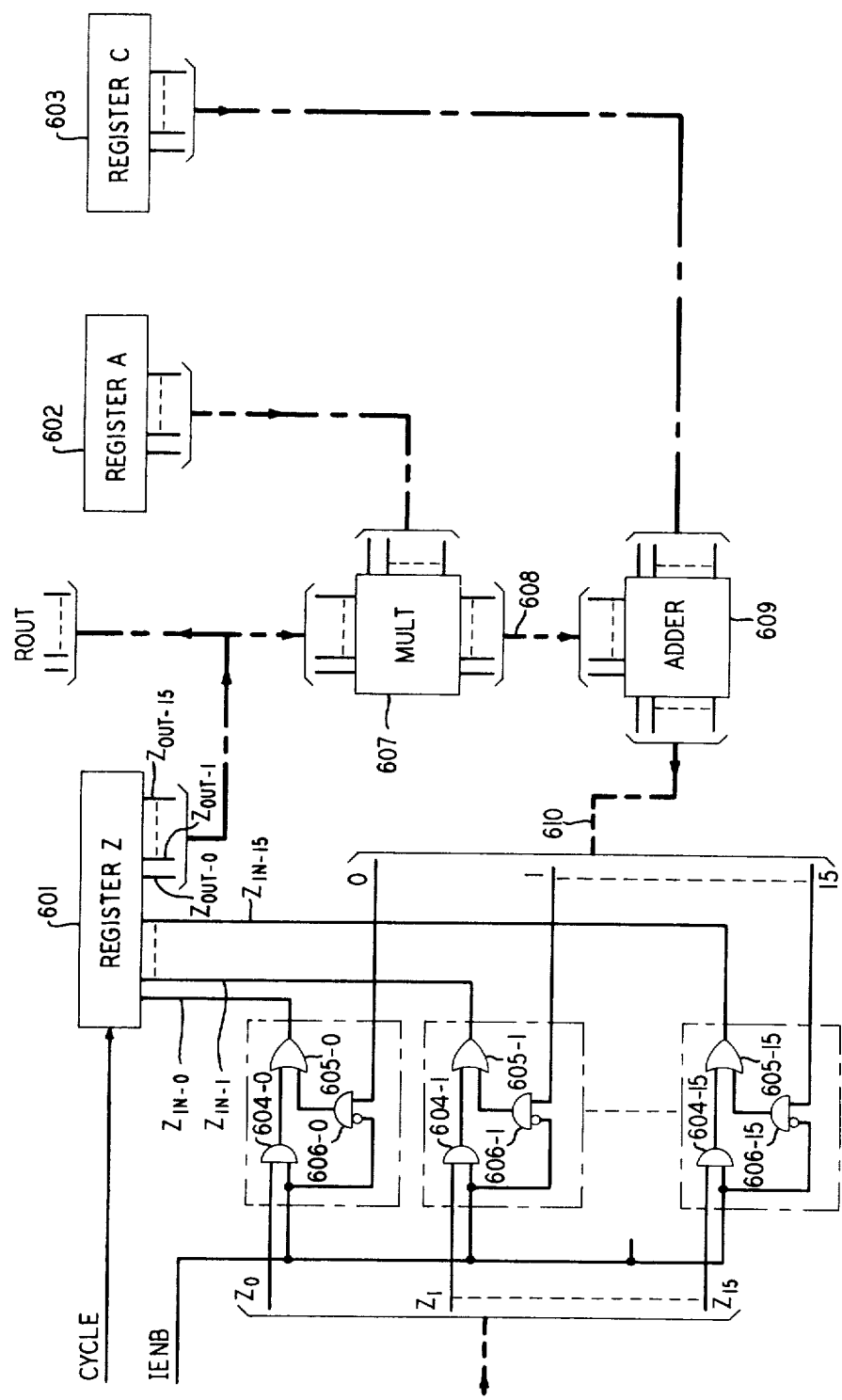
FIG. 6 is a block diagram of a pseudo-random number sequence generator constructed in accordance with the present invention.

The next step (step B) of the process by which SCW's are assigned to attribute values is, as stated previously, to generate a particular sequence of pseudo-random numbers in response to the m-bit value generated in the preceding mapping process. This process, again, must be a reproducible or repeatable one: for any given m-bit input, the same output sequence must appear. A block diagram of apparatus which may be used to generate this sequence using the linear congruential technique described in D. E. Knuth, *The Art of Computer Programming*, Vol. 2, Sec. 3.2.1 (1969) is shown in FIG. 6. In this technique, a sequence of numbers Z is formed such that $$Z_i = [[A \times (Z_{i-1})] + C] \text{modulo } M, \quad (2)$$

where A and C are constants and M is the desired number of bits in each word in the sequence. Other techniques for achieving a similar result do exist, and could instead be used.

In FIG. 6, registers 601, 602 and 603 are all m-bits wide; an acceptable and practical value for m is m=16. Register 601 includes m input and output terminals labeled $Z_{in-0}$ through $Z_{in-15}$ and $Z_{out-0}$ through $Z_{out-15}$, respectively, and a further input lead labeled CYCLE. The latter input is arranged such that a positive going transition causes the value then present on the $Z_{in}$ lines to be read into and stored in the register; the same value is then available on output lines $Z_{out}$ until another pulse on the CYCLE line changes the stored value.

Registers 602 and 603 may be read-only memories which are initially loaded with particular m-bit numbers when the circuit is fabricated; once loaded, these numbers are not thereafter changed. While many acceptable numbers may be utilized, one pair of acceptable values for m=16 are A=0100110011010101 and C=0011011000011001.

Operation of the pseudo-random number generator of FIG. 6 is started by initializing register 601 with the m-bit value output from lines $Q_0-Q_{m-1}$ of the circuit of FIG. 4. (It is now assumed that m=16.) This is accomplished by (1) placing these bits on the input lines $Z_0$ through $Z_{15}$, (2) raising the lines IENB to the high state, and (3) sending a pulse to register 601 on the CYCLE line. The $Z_0$ input is thus passed through AND gate 604-0 and OR gate 605-0 to input $Z_{in-0}$; the other inputs $Z_1-Z_{15}$ are similarly applied. After applying the initialization pulse on the CYCLE line, IENB is placed in the low state, disabling AND gates 604 and enabling a second series of AND gates 606-0 through 606-15; IENB remains low until initialization is again desired.

The m-bit output of register 601 on lines $Z_{out}$ are applied to one set of inputs of a multiplier 607 which receives a second set of inputs from register 602. The multiplier 607 is arranged to produce at its outputs (cable 608) the *low order* m-bits of the product (in binary form) of the numbers stored in registers 601 and 602. In like fashion, an adder 609 is arranged to receive the m-bit number presented on cable 608 as well as the m-bit number stored in register 603. The adder output, which ignores any carry out of the high order bit, is coupled via cable 610 to the inputs of AND gates 606-0 through 606-15.

At the end of the multiplicative and additive operations described above, a new m-bit integer will appear at the input to register 601; the next pulse on the CYCLE line will cause this integer to be substituted in place of the previously stored value, and also appear on the output lines labeled ROUT. Each CYCLE pulse thereafter will cause the generation of yet another m-bit number on the ROUT lines.

It can be shown mathematically and observed empirically that the sequence of numbers generated using the foregoing procedure resembles randomly chosen m-bit integers; the bit patterns do not appear to follow any sensible sequence of values. However, the process is reproducible (i.e., for the same input value and the same number of cycles, the same output will appear) and the output sequence for a given input value will always be the same. The repetition period, for appropriately chosen values of constants stored in registers 602 and 603, will be very long, typically thousands of cycles.

Figure 7:
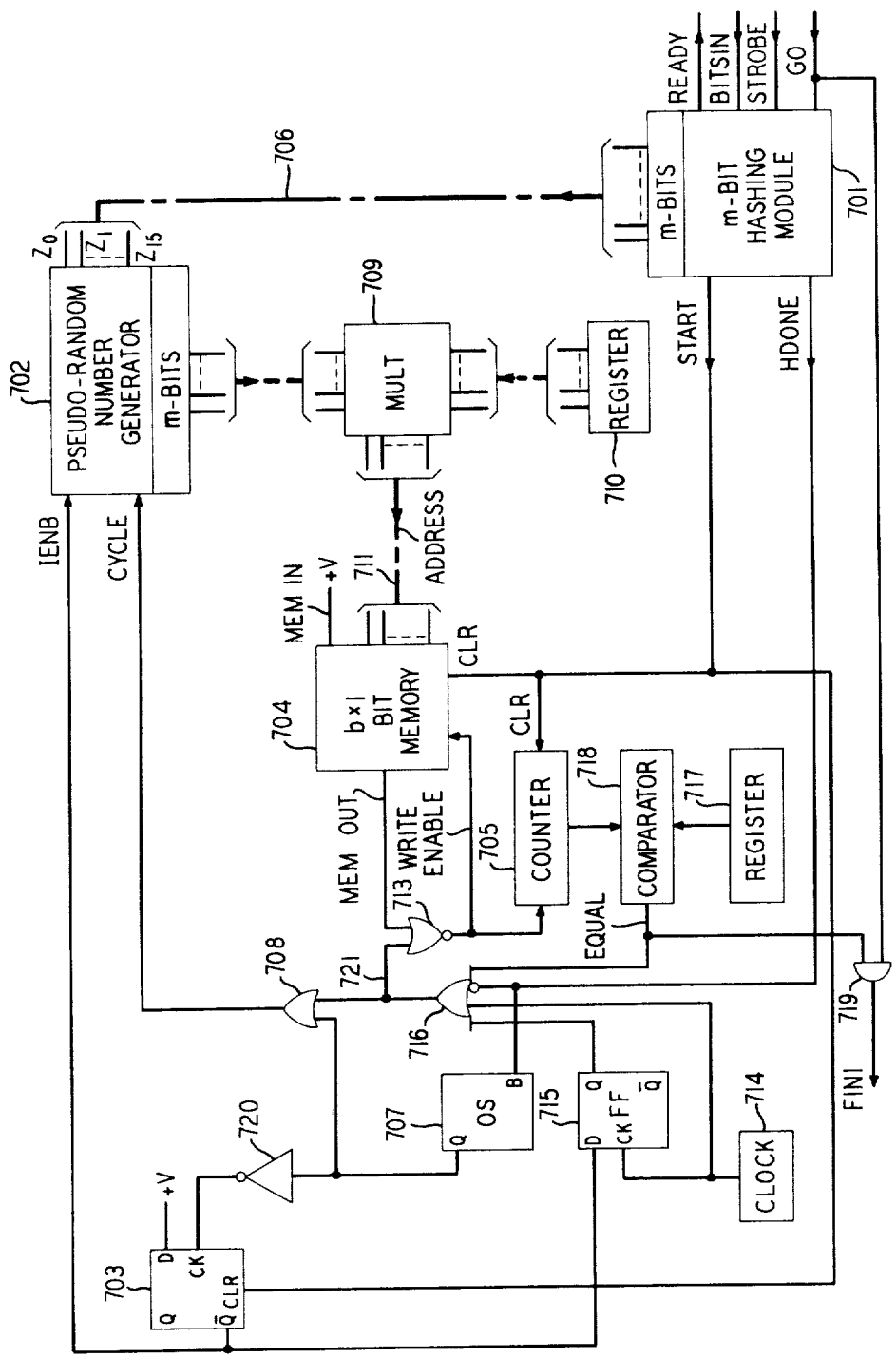
FIG. 7 is an overall block diagram of a code word generator constructed in accordance with the present invention.
Figure 8:
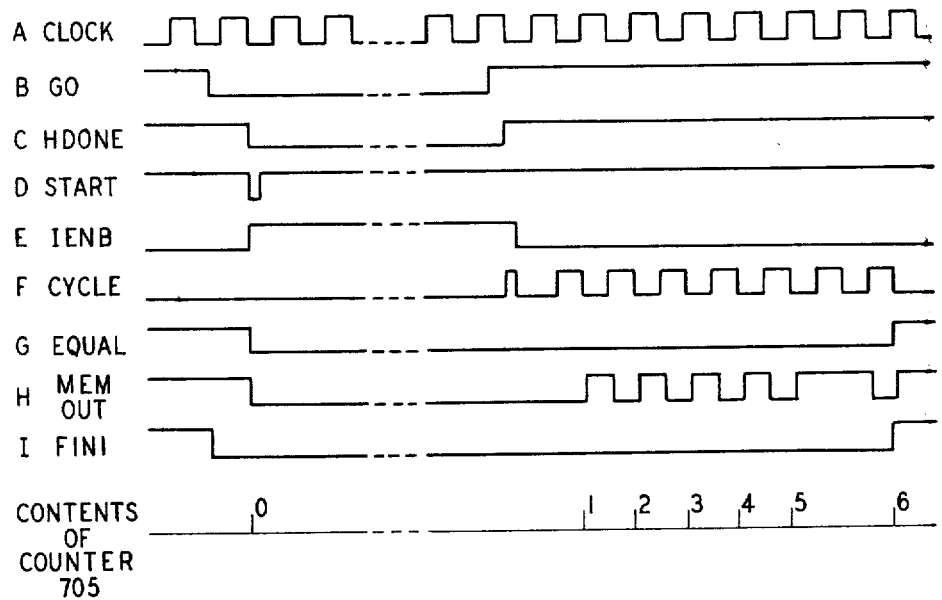
FIG. 8 is a timing diagram for the circuit of FIG. 7.

The remaining steps in the formation of individual codes are performed using the circuitry shown in block diagram form in FIG. 7; a timing diagram for the circuit is shown in FIG. 8. Briefly stated, this circuitry uses the sequence of m-bit pseudo-random numbers output from the circuit of FIG. 6 to generate a width b weight K individual code by first scaling the numbers to the range between 0 and b and then using the scaled numbers to determine the positions of the K bits within the individual code word. Here again, it is desired that a given m-bit input sequence produce the same output code, so that the process is reproducible; in addition, it is desired that the positions of the K ONES in the output string of b bits appear to be random. In FIG. 7, the mapping circuit of FIG. 4 is combined and shown as block 701; the pseudo-random sequence generator of FIG. 6 is shown as block 702.

Recalling the previous discussion, when circuit 701 begins its operation, a short pulse is generated on the line labeled START (see FIG. 8, waveform D). This pulse is used to clear a memory 704 and a counter 705, the functions of which will be described hereinafter. In addition, a flip-flop 703 is cleared, so that its $\overline{Q}$ output, which is connected to the IENB input of circuit 702, goes high. The m-bit code generated by circuit 701 is coupled to the $Z_0$–$Z_{15}$ inputs of circuit 702 via cable 706; when circuit 701 has completed its processing, the HDONE lead (waveform C) will go high, triggering a one-shot 707 to pass a pulse through OR gate 708 to the CYCLE input to circuit 702 (waveform F). Now, the m-bit output of circuit 701 is contained in circuit 702, and flip-flop 703 is toggled on the trailing edge of the one-shot output by virtue of inverter 720 so that IENB thereafter remains low (see waveform E).

The m-bit output generated by circuit 702 is coupled to one set of inputs of a digital multiplier 709, which receives its other inputs from a static register 710 which contains the number "b" stored therein in binary form. Multiplier 709 is arranged to discard the low order m-bits of the product that it forms, and to retain only the high order $\log_2$ b bits. This assures that the output of the multiplier on lines 711 will be in the range between 0 and b-1. (Stated differently, the m-bit output of circuit 702 is regarded as having a binary point exactly to the left of the m binary bits; only the integer part of the product is retained.)

In order to accumulate the first K *different* numbers output from multiplier 709, line 711 is connected to the address input of a b×1 bit memory 704. The memory is arranged so that the bit address appears on the output wire labeled MEMOUT (see waveform H for an example): if this bit is a zero, a high is passed through OR gate 713 each time the signal on line 721 goes low, incrementing counter 705 and changing the addressed bit to a one. (This occurs because the line labeled WRITE ENABLE is made high, reading in the high signal permanently applied to the line labeled MEMIN.) On the other hand, if the bit addressed was a one, the output of OR gate 713 is low, and counter 705 does not increment.

The remaining numbers in the output code are generated in a similar manner, under the control of a clock 714, which provides a low on the Q output of a flip-flop 715 when IENB is low; succeeding transitions generated by clock 714 are passed through a NOR gate 716, thereby providing the succeeding highs needed to generate CYCLE pulses for circuit 702 and the lows needed to enable NOR gate 713 to advance counter 705. When the count in counter 705 reaches the number K stored in a register 717, the output of a comparator 718 will generate a high signal on its output labeled EQUAL (see waveform G). This high closes gate 716, disabling further CYCLE pulses from reaching circuit 702. Concurrently, AND gate 719 is made to go high, signaling the end of the code generation process with a signal labeled FINI (see waveform I). At this time, the process of generating the individual code is complete: a width b, weight K code is stored within memory 704.

Figure 9:
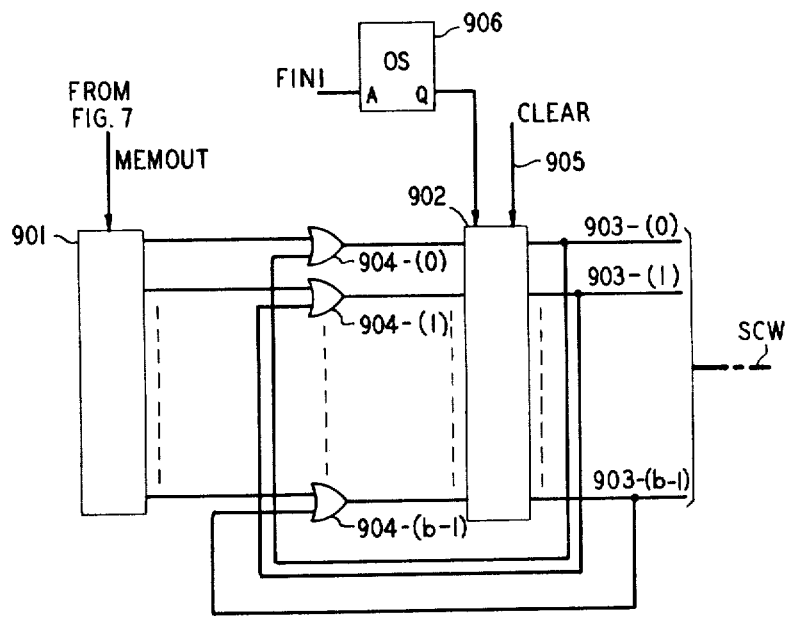
FIG. 9 is a block diagram of apparatus used to combine individual code words formed by the circuit of FIG. 7 into superimposed code words.

The individual code may be read out from memory 704 simply by applying a sequence of addresses from 0 to b−1 on line 711, and by connecting the MEMOUT line to a suitable register, such as b bit register 901 of FIG. 9.

7. Combining Individual Codes

A superimposed code word (or a query) may be formed for a record simply by logically OR'ing together several individual codes; the apparatus shown in FIG. 9 may be used for this purpose. A second register 902 also capable of storing a b bit word includes b output lines 903-(0) through 903(b−1) which are coupled to first inputs of a series of OR gates 904-(0) through 904(b−1). The remaining inputs to the OR gates are coupled to the outputs of register 901. Initially, register 902 is cleared by application of a pulse on line 905. When an individual code has been entered in register 901, the FINI output from FIG. 7 is used to trigger a one-shot 906, which cycles register 902: the present contents of the register are then replaced by a new b bit word which is formed by logically OR'ing the old register contents with the contents of register 901. As new individual codes are generated, they are entered in register 901, and the process is repeated.

Figure 10:
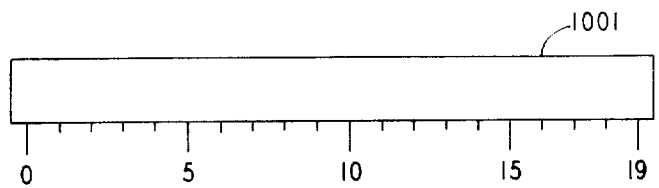
FIGS. 10–14 are graphic representations showing the formation of superimposed code words by the combination of individual codes and a representation of a query mask.
Figure 11:
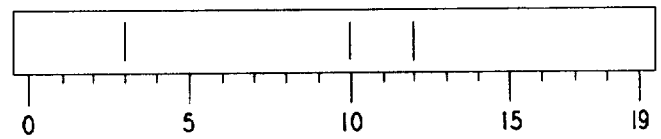
Figure 12:
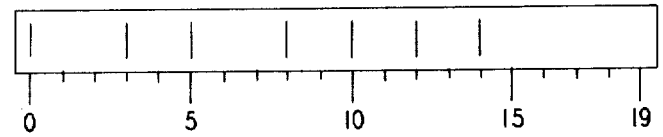

Referring to FIG. 10, a rectangular area 1001 is divided into 20 slots or bit positions indicated by rulings 0 to 19. Each position corresponds to a particular bit in the word being generated, and may include a mark or a space. In FIG. 11, the positions corresponding to the individual code for the attribute value "E A S T" have been marked; in FIG. 12, additional marks have been added for the attribute values "E N D" and "B O D Y". It is to be noted here that the resulting code includes 7 (not 9) marks. First, the code for "E A S T" overlaps with the code for "E N D" at position 3 due to the letter E in both. Second, there is a redundancy in the code itself since a bit in position 12 is indicative of B in "B O D Y" and EA in "E A S T". When marks representing all of the ONES in the individual codes listed in Table 2 have been processed in the circuitry of FIG. 9, the resulting SCW is illustrated graphically in FIG. 13. Here, the individual codes for each of the fifteen attribute values have been combined or superimposed so that the SCW for the record consists of a total of 13 marks in the 20 bit positions.

The foregoing example illustrates that as the number $r_i$ of attribute values per record increases, the density of marks in the SCW also increases, but not in a strictly linear relation, due to superimposition in certain bit positions. Experimentally, it has been found that a bit density of approximately 50 percent is ideal for the SCW's. Statistically, this density corresponds to a 70 percent ratio between the total number of ONES in all individual codes for a record and the word width b. Since a particular average value for $r_i$ is usually known in advance, and a value for b is set by the circuit arrangement used, the value of K may be set in accordance with the relationship:

$$K \approx 0.70b/r_i \qquad (3)$$

Thus, if records having an average of eight attribute values are in the collection, and if a word length of 148 bits is chosen then $K \approx 0.70(148)/8 \approx 13$ is a reasonable choice. However, it is also to be noted that K need not be constant for all attribute values: instead, smaller values of K are preferable where the attribute values occur frequently in the collection, while larger values are permissible for rare values. Discrimination between different attribute values on the basis of frequency of occurrence may be accomplished with additional logic circuitry which utilizes state of the art techniques.

8. Searching Module a. Introduction

Returning to the previous example, if it is desired to determine which of the records in the collection of FIG. 1 includes the attribute values "A U T O" and "B O D Y", a query mask is generated using the same techniques described above. Since the code generation technique is reproducible, the query would be shown in FIG. 14, i.e., six marks positioned in bit locations 0, 5, 12, 13, 18 and 19. Visual inspection of the records of FIG. 1 reveals that the correct answer to the query is record 2 alone, since it includes the desired attribute values. A brief general description of the mechanics of making this selection via superimposed coding will be instructive.

Figure 13:
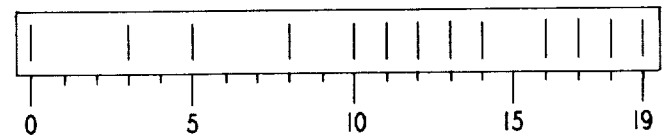
Figure 14:
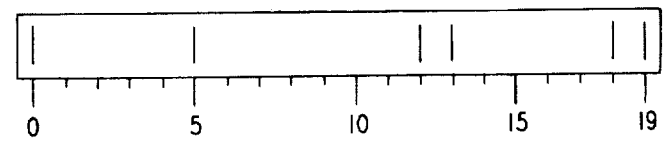
Figure 15:
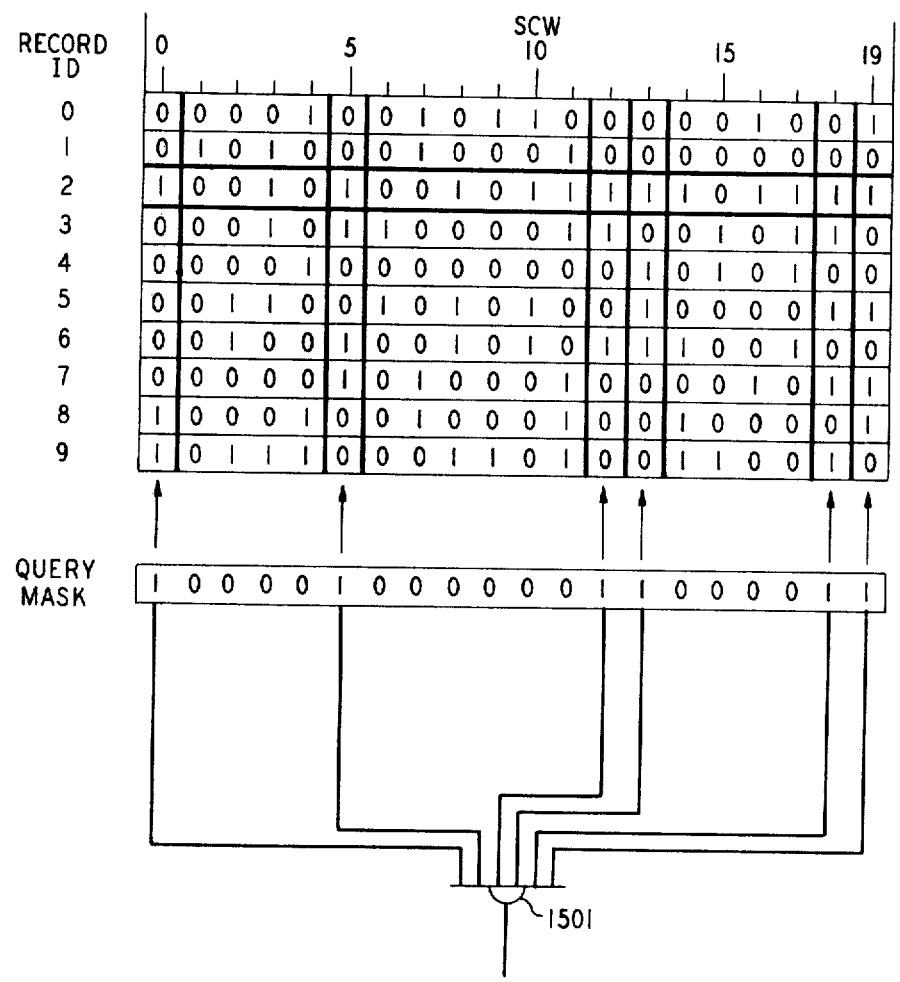
FIG. 15 is a graphic representation of the AND'ing process by which it may be determined if a superimposed code word satisfies a query mask.

In FIG. 15, 20 bit SCW's have been listed for each of the records 0 through 9 in the collection of FIG. 1; the SCW for record 2 is the same as is shown in FIG. 13, while the remaining code words have been also generated from the n-grams of TABLE I, for the purpose of illustration. The query mask of FIG. 14 is also redrawn in FIG. 15.

The SCW file and the query mask are constructed in accordance with the theory of superimposed coding, so that if a SCW does *not* contain "ONES" in all bit positions singled out by the "ONES" in the query mask, then the corresponding record cannot possibly satisfy the match specification. On the other hand, if the ONES in the query mask are matched by the SCW, then the record identified may contain the desired attribute values. Stated differently, the query mask matching requirement is a *necessary* but not a *sufficient* condition for a record to satisfy the match specification. Some records which are preselected by searching module 218 of FIG. 2 will not actually possess the attribute values of interest, but will be "false drops". These records will be detected by comparator 223 of FIG. 2, and then discarded; the number of false drops that are expected is a function of the values chosen for "b" and "K", and may be made suitably small.

Returning to the example of FIG. 15, the SCW for only record 2 satisfies the requirement that has ONES in all bit positions signaled by ONES in the query mask; all other records do not match, since they do not contain the desired attribute value (see FIG. 1), while record 2 is a true drop, since it does have the values sought. Records 0, 1 and 3–9 will not be selected by searching module 218 of FIG. 2, since they have SCW's which do not contain "ONES" in all of the locations in which the query mask has "ONES".

Although the example of FIG. 15 demonstrates the selectivity of the searching process, it is also evident from the nesting characteristic utilized to generate the SCW that the searching process may start with the entry of any one of the first alphanumeric characters of an attribute valve. For example, the individual code produced in response to the character B by setting bit position 12 to a ONE will produce the number of partially matching SCW's or the feedback response of 3. "BO" sets bits in positions 5 and 12 to ONES but the feedback value is still 3. The next entry of character "D" for the sequence of "BOD" for "B O D Y" uniquely identifies one partially matching SCW from the query mask with a ONE only in positions 0, 5 and 12. This example demonstrates that the response of the system of FIG. 1 is a function of the content and manner the query mask is generated or the query strategy. Since the feedback informs the user on the progress of the retrieval operations, it directs the user how to operate the system more efficiently.

The bit matching technique described above can be performed quite readily by special purpose hardware which is described in detail hereinafter. Basically, as shown in FIG. 15, this hardware could include an AND gate 1501 arranged to monitor only the bit positions signaled by "ONES" in the query mask; these bit locations for each SCW are examined in turn, and only when the output of gate 1501 goes high is there a match. This technique does not require accessing of all of the bN bits stored in a memory which contains SCW's for N records. Rather, the accessing is limited to only those locations which are called for in the query mask. Obviously, since the SCW's could be stored in many different types of memory devices, such as charge coupled devices, magnetic bubble devices or delay lines, searching techniques different from the one described below could be employed.

b. Detailed Description of Searching Module 218 of FIG. 2

Figure 17:
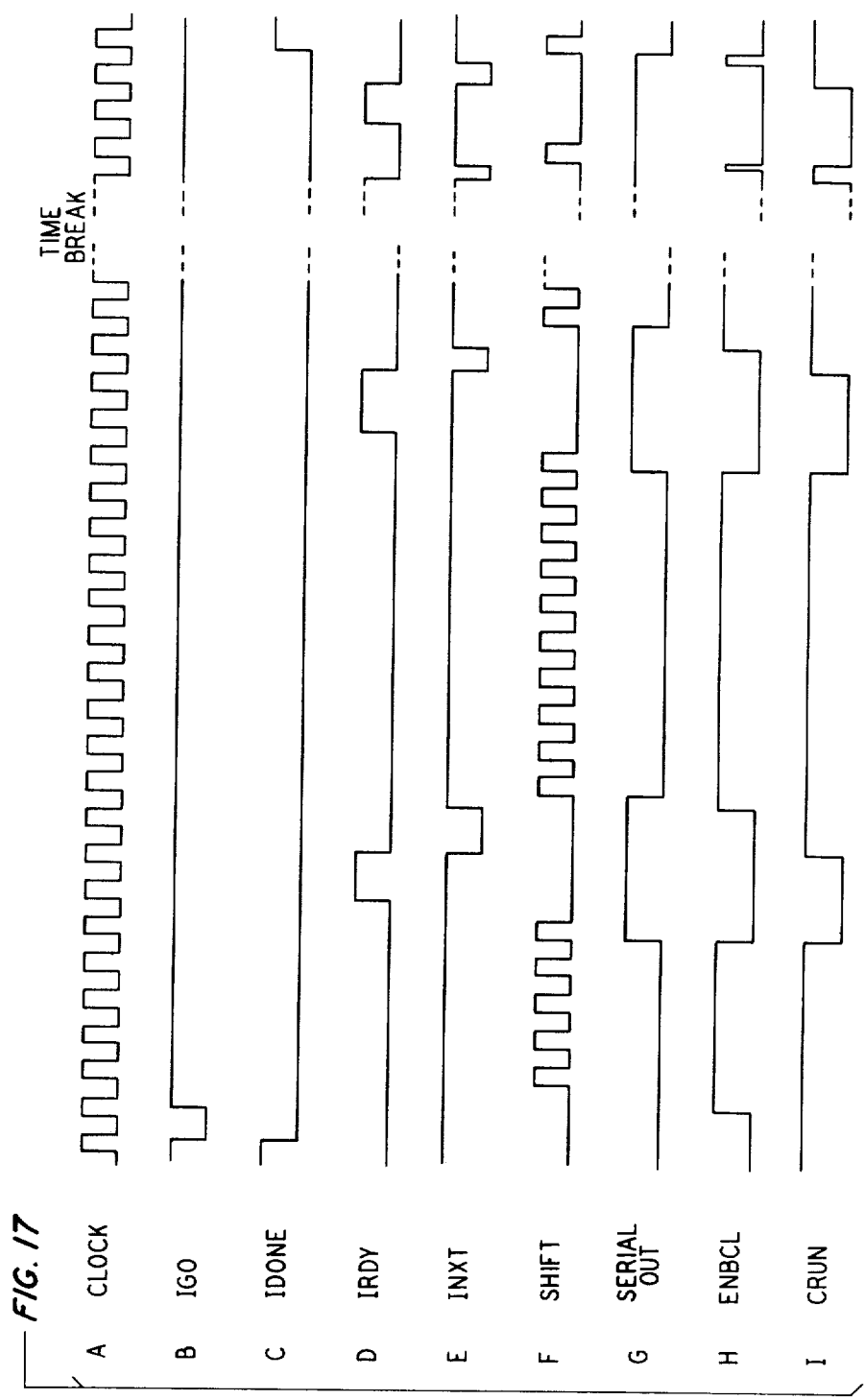
FIG. 17 is a timing diagram for illustrating the operation of apparatus of FIG. 16.
Figure 18:
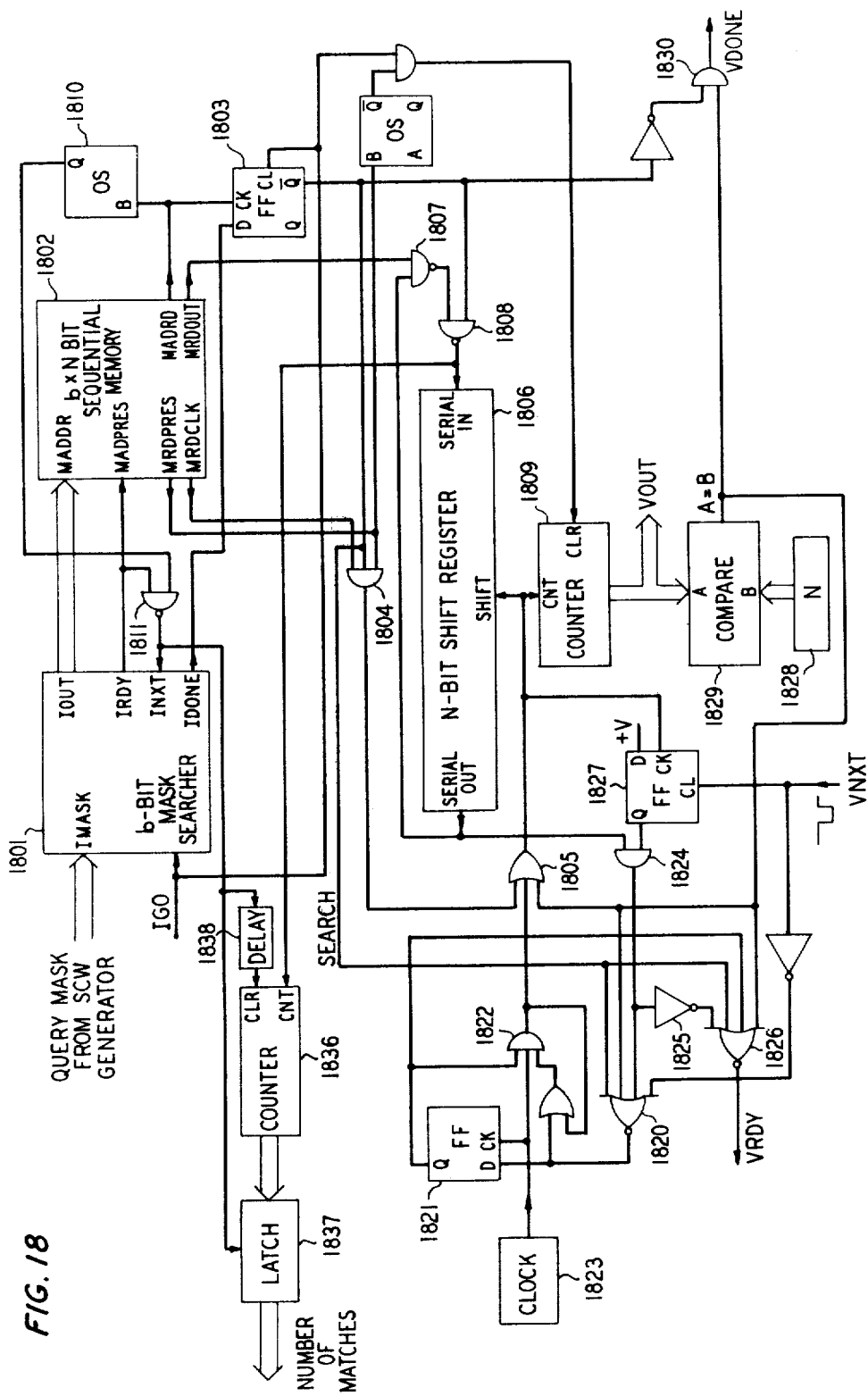
FIG. 18 is an overall block diagram of a superimposed code word searching module constructed in accordance with the present invention.
Figure 19:
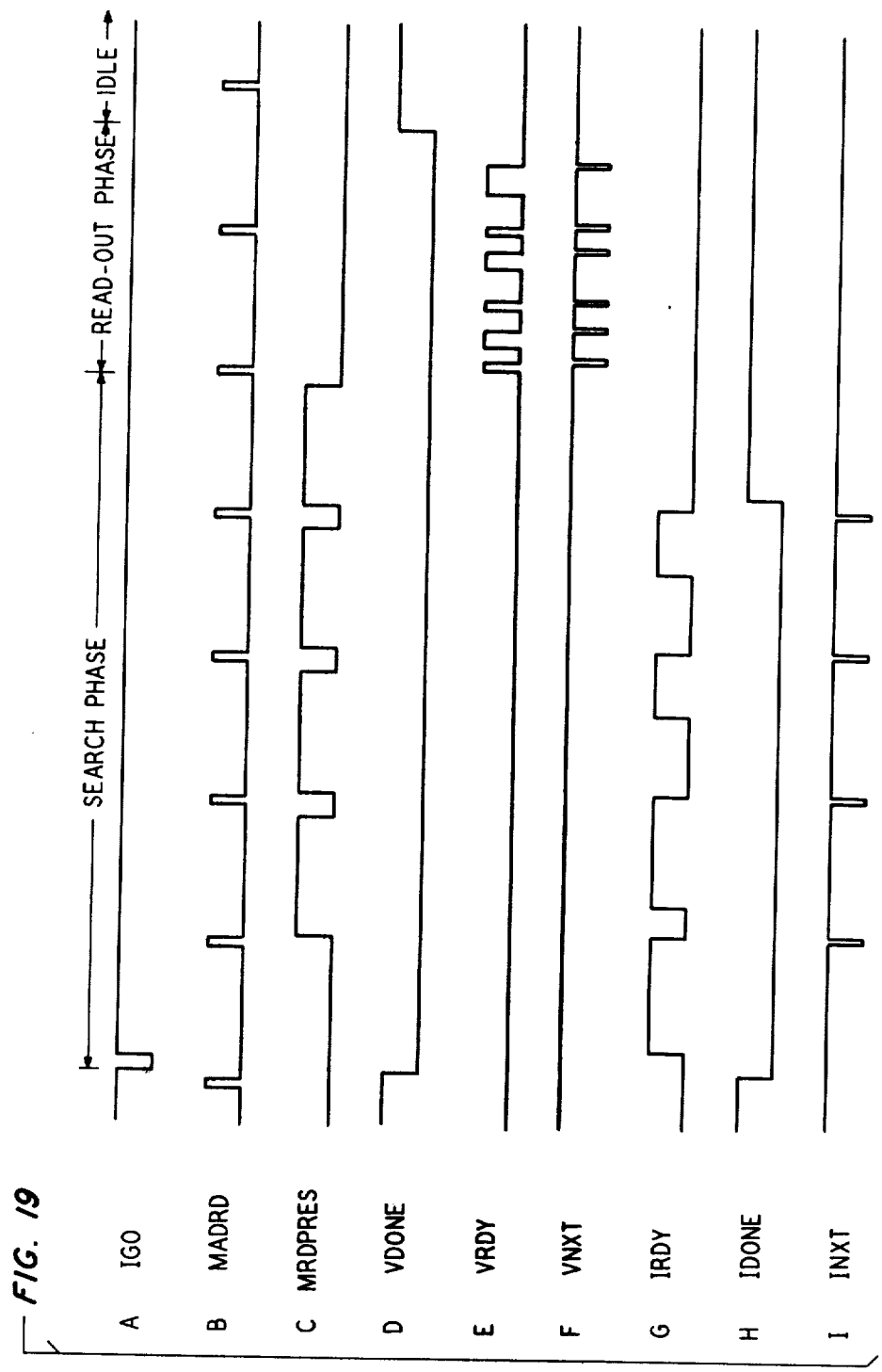
FIG. 19 is a timing diagram for demonstrating the operation of apparatus of FIG. 18.

An overall block diagram of a superimposed code word searching module constructed in accordance with the principles of the present invention is shown in FIG. 18; a timing diagram for the module is shown in FIG. 19. The module includes a b bit mask searcher 1801, which itself is shown in block diagram form in FIG. 16; the timing diagram for this circuit is shown in FIG. 17.

As stated previously, the function of the apparatus of FIG. 18 is to find matches to a given query mask in a file of SCW's, which may be stored in a sequential access memory 1802 which corresponds to auxiliary store 217 of FIG. 2. This circuit is advantageous, in part, because it *can* operate with a sequential memory, such as a delay line, a bubble memory, or other similar devices, rather than a parallel access memory: the latter would undoubtedly operate faster, but the former is less expensive and more readily available. Obviously, some degree of parallelism could be attained even with sequential memories, as by running several at the same time.

Basically, memory 1802 is arranged so that the N SCW's stored therein can be serially read out *by bit position*. For example, if bit position 0 is input on the line labeled MADDR, then an N bit binary sequence is read out on the line labeled MRDOUT; the sequence includes the 0'th bit of each of the N SCW's stored in memory. Similarly, if bit position 1 is input on MADDR, then the 1st bit of each SCW is sequentially presented on MRDOUT. Timing control into and out of memory 1602 is achieved by the lines labeled MADPRES, MRDPRES, MADRD and MRDCLK, as follows: the presence of a valid address, i.e., a value in the range between 0 and b-1, on line MADDR is signaled by raising MADPRES to a high state. The memory is arranged to read the data on MADDR only at specific times determined by the internal condition of the memory devices. When this time to accept a new address occurs, a positive going pulse appears on the MADRD line, causing the address to be read, provided MADPRES is high. After the address has been read, MADRD goes back to a low state. When the first bit of output data becomes available on line MRDOUT, the line MRDPRES goes high, and stays high until all N bits have been read. A clock output on line MRDCLK is synchronized with the data output on MRDOUT.

Figure 16:
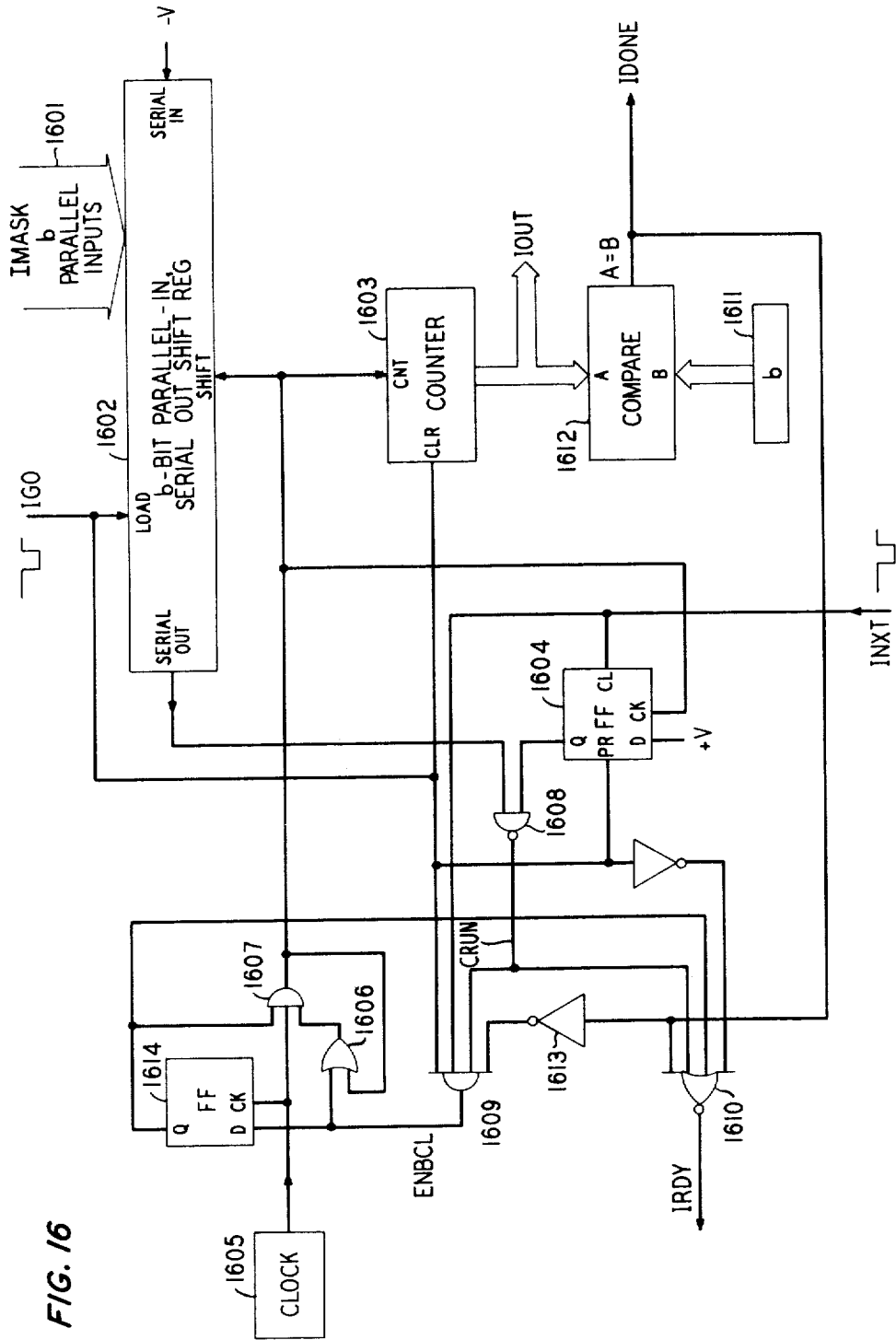
FIG. 16 is a block diagram of a b-bit mask searcher constructed in accordance with the present invention.

The purpose of the mask searcher of FIG. 16 is to accept a b bit input representing the query mask on the b lines collectively labeled 1601, and to generate therefrom a sequence of binary numbers which represent the locations of the "ONES" in this query mask. Operation begins when a negative going pulse is applied on the line labeled IGO (see FIG. 17, waveform B), causing the query mask value to be loaded into a b bit parallel-in, serial-out shift register 1602, causing a counter 1603 to be cleared, and causing a flip-flop 1604 to be preset to provide a high Q output. If the signal on the ENBCL input to OR gate 1606 is high, timing pulses generated by a clock 1605 (see FIG. 19, waveform A) will be passed through AND gate 1607 and used both to advance the count in counter 1603 and to shift the contents of register 1602. The shift waveform is shown in FIG. 17, waveform F. The serial output from register 1602 is applied to one input of NAND gate 1608, the other input of which is supplied from the Q output of flip-flop 1604: as long as the output of register 1602 is low (i.e., all zeroes), the CRUN output of gate 1608 remains high (see waveform I), keeping the ENBCL output of AND gate 1609 high (see waveform H).

When a "ONE" is output from register 1602 (see waveform G), the CRUN signal goes low, bringing ENBCL low. When the output of clock 1605 next goes low, the Q output of a flip-flop 1614 follows, thereby closing gate 1607. At this time, the count in counter 1603, which is output on lines IOUT, represents the position of the ONE bit in the query mask that has been detected. Concurrently, the IRDY output of NOR gate 1610 goes high (see waveform D), indicating to the circuitry of FIG. 18 that its processing may begin.

The above situation remains static until external processing has been completed, at which time a negative going pulse is applied on the INXT input line (see waveform E). This clears flip-flop 1604 and again renders CRUN high, so that operation as aforedescribed may continue. When the entire b bit word within register 1602 has been processed, the count in counter 1603 will match the fixed output of a static register 1611 which stores the value b in binary form. At this point, the IDONE output (see waveform C) of a comparator 1612 goes high, closing AND gates 1609 via inverter 1613. Both IRDY and ENBCL thereafter remain low, until a new query mask is to be processed.

Turning now to FIGS. 18 and 19, the circuitry used to perform searches through the stored SCW's to determine which of them satisfy a given match specification is shown in block diagram form. In this figure, the b bit mask searcher of FIG. 16 is labeled 1801, and the previously described b X N bit sequential memory which corresponds to auxiliary store 217 of FIG. 2 is labeled 1802.

The basic procedure followed by the circuit of FIG. 18 is (1) reading out a string of N bits for each bit position flagged by a ONE in the query mask, (2) logically AND'ing the first bit string with a string of ONES, on a bit-by-bit basis, and (3) logically AND'ing each further string with the result of the previous AND'ing, so that, when completed, an N bit word will be formed in which the location of a ONE bit represents the ID of a record which satisfies the query mask. This general procedure will be illustrated in the example of FIGS. 20 and 21.

Figures 20, 21:
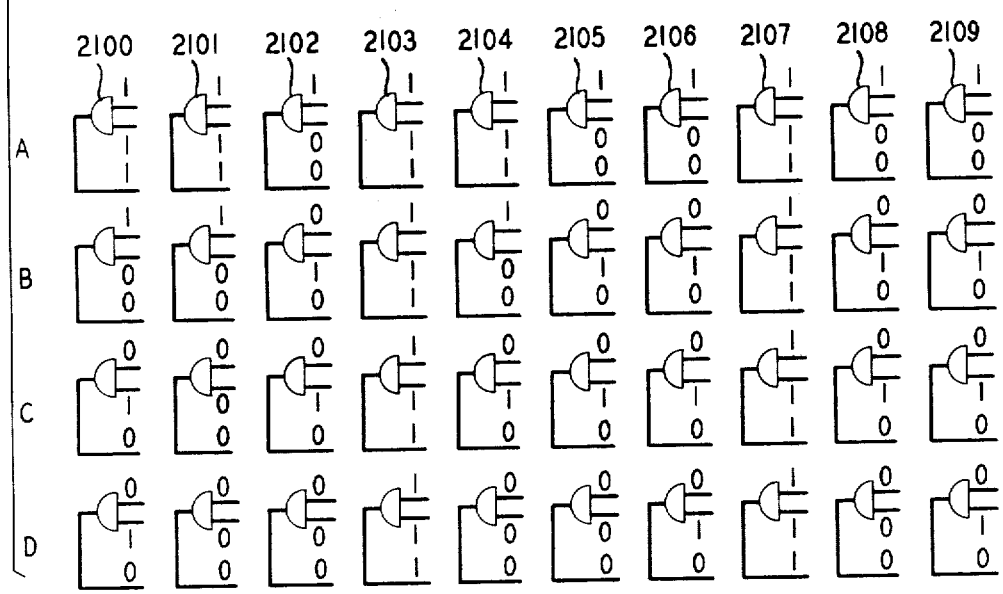
FIG. 20 is yet another example of superimposed code words (SCW's) and a query mask.
FIG. 21 is a graphic representation of the AND'ing process performed by the circuit of FIG. 18 to determine which SCW's of FIG. 20 satisfy the query mask shown therein.

In FIG. 20, 10-bit SCW's having ID's 00 through 09 are shown, together with a 10-bit query mask. This different bit width readily illustrates that the inventive principles utilized herein are readily adaptable to different size SCW's. The mask has ONES in positions 01, 03, 06 and 07, which are the only positions of interest, since the goal of the apparatus of FIG. 18 is to find out which SCW's have ONES in all bit positions signaled by ONES in the query mask.

In FIG. 21, line A, the data from bit position 01 of each SCW is logically AND'ed with a string of ONE bits using a series of AND gates 2100–2109. The result (which is the same as the data from bit position 01) is used as one set of inputs in FIG. 21, line B; the other set of inputs is the data from bit position 03 of each SCW, and the result of the AND'ing is used in FIG. 21, line C. The foregoing process is repeated for each bit string signaled by a ONE in the query mask, namely, for positions 06 and 07. These results are shown in FIG. 21, lines C and D. After the final AND'ing, as shown in FIG. 21, line D, the *presence* of a ONE bit indicates that the query mask has been satisfied; the *position* of the ONE bit indicates the ID of the record which matches. In this example, matches are indicated by ONES in positions 03 and 07. Visual inspection confirms that SCW's with these ID's do indeed have ONES in positions 01, 03, 06 and 07, as desired. In FIG. 21, the use of AND gates 2100-2109 is only exemplary. The following discussion reveals that a single gate (NAND gate 1807 in FIG. 18) performs the same function on a serial basis.

Returning now to FIGS. 18 and 19, it is initially to be noted that operation is divided into two phases, i.e., searching and readout. In the search phase, operation begins by placing a negative going pulse on the IGO line (see waveform A of FIG. 19). This clears a flip-flop 1803, and allows mask searcher 1801 to begin processing the query code applied on the IMASK lines. When searcher 1801 has found the first ONE in the mask and converted it to a binary number, the number appears on the IOUT leads, which are connected directly to the MADDR inputs of sequential memory 1802. Concurrently, the IRDY output of searcher 1801 goes high (see waveform G), and this signal is coupled to the MADPRES input of memory 1802.

When memory 1802 is ready to begin reading out the data contained in the selected bit location, the MRDPRES line goes high (see waveform C) so that clock pulses from the MRDCLK output of the memory can pass through an AND gate 1804 and an OR gate 1805 to the shift input of an N-bit shift register 1806. This shift register is initially loaded with all ONES, for reasons explained previously; at each pulse on the MRDCLK line, the bit output from register 1806 is AND'ed with the bit output on the MRDOUT line, in NAND gate 1807, and the resultant bit is reapplied to the shift register via NAND gate 1808. (It is to be noted here that since both gates 1807 and 1808 are NOR gates, inversion of the data polarity is cancelled; also, gates 1808 and 1804 are held open by the high $\overline{Q}$ output of flip-flop 1803.)

The above process continues until all of the bits in the chosen string have been AND'ed with the contents of register 1806, and the results reentered in the register. At this point, a pulse on the MADRD output of memory 1802 (see waveform B) produces a pulse at the output of a one-shot 1810, which is passed through a NOR gate 1811 to the INXT input of searcher 1801 (see waveform I). Since the IDONE output of searcher 1801 is low, the MADRD output of memory 1802 does not change the state of flip-flop 1803; accordingly, the location of the next ONE in the query mask is transferred from searcher 1801 to memory 1802, and the data in the selected bit string is again AND'ed with the contents of register 1806.

When the location of all of the ONES in the query mask have been output from searcher 1801, its IDONE output goes high (see waveform H). The next clock input to flip-flop 1803 causes its $\overline{Q}$ output to go low, disabling AND gate 1804. The search cycle of the circuit of FIG. 18 is now complete, and register 1806 now contains ONES in bit positions corresponding to the ID's of selected records.

The read-out phase of the cycle is now ready to begin. This phase is carried out in a manner nearly identical to that used in mask searcher 1801. Initially, when the $\overline{Q}$ output of flip-flop 1803 goes low, the output of NOR gate 1820 goes high. This, in turn, causes the Q output of flip-flop 1821 to go high, so that AND gate 1822 is permitted to pass timing pulses generated by a clock 1823. At the occurrence of each clock pulse, a shift signal is delivered to register 1806 and the count in counter 1809 is incremented by one. The input to register 1806 is a ONE, since one input of NOR gate 1808 is tied to the low $\overline{Q}$ output of flip-flop 1803; the output of register 1806 is applied to an AND gate 1824. As long as the output of the shift register 1806 continues to be ZEROES, operation in this fashion continues.

When a ONE is output from shift register 1806, the output of gate 1824 goes high: this makes the output of inverter 1825 low, and the output of NOR gate 1826 high, providing a high VRDY signal (see waveform E). At this time, the count in counter 1809, as provided on the lines labeled VOUT, represents the ID of the record which satisfies the match specification.

Operation is resumed by application from an external source of a negative going pulse on the line labeled VNXT (see waveform F). This brings the Q output of flip-flop 1827 low, again raising the output of NOR gate 1820 and again passing clock pulses through gates 1822 and 1805 to shift register 1806 and increment counter 1809.

After the entire N-bit word has been read from register 1806, the count in counter 1809 will equal the value N stored in static register 1828. Accordingly, the output of a comparator 1829 will go high, raising the VDONE output (see waveform D) of gate 1830 to indicate completion of the read-out phase.

9. User Feedback on Search Progress

Now that the part of the operation of the circuit of FIG. 18 concerned with the searching process has been described, the operation of counter 1836 and latch 1837, which provide the feedback to the user, will be described. As previously mentioned, the feedback informs the user on the progress of the search of the SCW auxiliary file by indicating the number of matches or drops after each alphanumeric character input to the query mask. Actually, the feedback first indicates the total number of records stored in the system of FIG. 1. This enables the user to determine the selectivity being produced after the first character input. After each subsequent character input, the feedback indicates the number of drops produced in response to the total character input sequence from the user. An advantage of the feedback is that it serves as a guide on the progress of the search, and the informative value is highly useful to the user no matter what that person's level of experience is in operating the information retrieval system.

In operation, counter 1836 is incremented by the number of ONES produced each time the content of shift register 1806 is serially applied in succession to one input of NAND gate 1807. The other input to NAND gate 1807 is the SCW content of memory 1802. Since register 1806 is initially loaded with all ONES, the initial output of counter 1836 will be the value of N which is the maximum number of records in disk store 227 of FIG. 2. After each alphanumeric character entry contributes to the query mask, the content of register 1806 is compared to that of memory 1802; and upon the coincidence of ONES at gate 1807, NAND gate 1808 produces a ONE output which increments counter 1836. When the entire content of register 1806 is recirculated via gates 1807 and 1808, the value of the count is strobed by latch 1837. This operation occurs for each column of the width of the SCW. Counter 1836 is then cleared by the amount of delay introduced by delay 1838 for the next operation.

Latch 1837 provides an output indicative of the number of matches, which is fed back to display 212. It should be understood that those skilled in the art may utilize other forms of feedback rather than visual to inform the user on the progress of the search. For example, an audio tone that varies in pitch related to the number of matches in some circumstances may be a more effective means of indicating the incremental selectivity produced by each character addition to the query.

Reference to the timing diagram of FIG. 19 will provide the timing sequence of signals, in relation to the other circuit operations, to operate counter 1836 and latch 1837. The same signal, INXT, produced by the output of NAND gate 1811 is used to strobe or load latch 1837 and then to clear counter 1836. Because delay 1838 is present, counter 1836 is cleared after latch 1837 is strobed. Since the INXT signal produces a pulse to initiate the search of N bits in each column, this operation will occur b times to complete the comparison between the query mask produced by searcher 1801 and the SCW content of memory 1802.

Although an illustrative hardware embodiment of the invention has been disclosed and a hardware embodiment is considered to be preferred, the inventive principles were also implemented by means of software technology. An experimental software implementation was programmed on a Digital Equipment Corporation PDP 11/45 computer using the UNIX language. A number of terminals were used as the interface, such as the General Electric 300, the Texas Instruments 745, the DASI 450, and the Datamedia 1520 and 2500.

The data base for the software system included 58,000 business, professional, and government listings from the January 1975 edition of the Suffolk County, New York, directory assistance operator's white pages. Three large structures, the U.S. Government, New York State, and Suffolk County, were contained in the listings. Each structure has nearly 400 listings and at least five levels of indentation. This data base was selected because its size and complexity were considered to be sufficient to represent almost all the problems of a complete directory. Some lines in the printed directory are spillovers of lines that are too long. Each logical line of the directory is a listing or record in the data base. A single 20,000,000 byte disk pack has sufficient storage capacity to store this data base.

The large data base used in the software system demonstrates that the feedback becomes more valuable during associative information retrieval from a larger collection of the business listings or records. More precisely, the query strategy developed from the feedback information significantly affects the amount of information to perform a given retrieval operation. Assume the search is for "RIVERHEAD MOBILE SERVICE" located at 415 E. Main in Riverhead and the query mask is based on the street number attribute of 415 and the street name attribute of E. MAIN. In this case, the feedback response to the character of 4 for a street number attribute would be 5,458 records, while the addition of 1 after the 4 will produce a feedback value of 644 records in response to 41. The final character of 5 in the street number attribute will produce a feedback value of 44 in response to the complete street number attribute of 415.

The progress of the search will advance significantly in response to the addition of the character of E to produce a feedback value of 11. In this case the E stands for EAST in the street name attribute. The addition of the character M for the other portion of the street name attribute reduces the feedback value to 6. The character of R is the first letter of the town name attribute, for example, Riverhead and reduces the feedback value to 4 records. In this example, each additional character provided significant progress on the search for the number of possible records which may satisfy the input information from the user.

In another example, wherein address attribute values are used to find "Consumer Distributing Co., 410 Union Blvd., W. Islip," it becomes apparent that feedback on the progress of the search advances to a small number of records rather quickly, but remains relatively constant with the addition of further characters. Starting at the point where 41 is entered, the addition of the character 0 for the complete street number attribute of 410 will reduce the feedback number from 644 to 90. The entry of U for Union as a street name attribute, reduces the number of possible matching records to 8. However, the addition of N, I and O after the letter U reduces the feedback number of 2 with the N and remains constant with the addition of the I and the O. The software system also has an arrangement to eliminate false drops in the process of producing records for readout. However, judicious selection of the superimposed codeword width and variable weighting, i.e., assigning different number of ONES to n-grams based on the frequency of occurrence in the records, will serve to reduce the number of false drops to a low level.

It is to be understood that the system described in the foregoing including the various arrangements within the system are merely illustrative of the application of the principles of the present invention. For example, a number of different arrangements may be utilized to generate the superimposed codes. Similarly, the selection of an expedient width of such codes and individual code assignment for alphanumeric character is related to the size and content of stored records in a particular application. Other modifications and various arrangements may be employed by those skilled in the art to speed up the coding of user information and the searching operation for record identification and retrieval. Auxiliary arrangements may be also utilized to focus the search by keeping track of eliminated codes so that with each successive character entry from the user the extent of search is significantly reduced. In other words, the feedback arrangement may serve to identify partially matching codes for internal use in addition to providing the number of such codes externally for directing the user. In terms of system applications, the number of accessing terminals interacting with the information retrieval system may be expanded through time sharing techniques. In a common carrier environment, this would enable these inventive principles to be utilized to provide an automated directory assistance function or other information retrieval functions to be used by a number of telephone operators or even telephone subscribers. Such changes, including numerous and varied other arrangements, may be utilized by those working in the art without departing from scope of the invention as defined by the appending claims.

What is claimed is:

1. A method of selecting at least one desired record in a collection of records stored in an electronic memory based upon a specification of desired attribute values included in the desired records, including the steps of:

(a) generating an individual binary code group using coding means, the individual binary code having K ONES and b-K ZEROES wherein the position and the number of the K ONES is indicative of each character and each character sequence included in the attribute values of each record, the location of the K ONES being determined by said coding means on a pseudo-random, reproducible basis;

(b) combining the individual code groups by logic means in circuit with said coding means to form cumulative code groups and said logic means combining the cumulative code groups to form a superimposed code group indicative of all the attribute values in each record, the superimposed code group having ONES in all locations in which the individual code groups have ONES and ZEROES in the remaining locations;

(c) storing the superimposed code groups and an associated index code for each of the superimposed code groups in an auxiliary electronic memory in circuit with said logic means, each associated index code capable of uniquely locating the related record in the collection of records in said electronic memory;

(d) generating a binary query code group from signals indicative of each character and sequence of characters in the desired attribute values using said coding means and said logic means performing the steps of (a) and (b) above;

(e) examining selected portions of the stored superimposed code groups in the auxiliary electronic memory in response to each of the individual codes using comparing means in circuit with said auxiliary electronic memory to identify partially matching superimposed code groups having ONES in all selected portions, the selected portions corresponding to the locations of the ONES in the query code group;

(f) indicating the number of partially matching superimposed code groups by feedback means connected to said comparing means to provide information on the progress of step (e) for each character; and (g) selecting the related records from the collection of records by accessing means in circuit with said comparing means using the associated index codes to provide the desired records from said electronic memory.

* * * * *